United States Patent
Arroyo et al.

(10) Patent No.: US 12,277,786 B2
(45) Date of Patent: Apr. 15, 2025

(54) METHODS, SYSTEMS, ARTICLES OF MANUFACTURE AND APPARATUS TO CATEGORIZE IMAGE TEXT

(71) Applicant: Nielsen Consumer LLC, Chicago, IL (US)

(72) Inventors: Roberto Arroyo, Guadalajara (ES); David Jiménez, Guadalajara (ES); Javier Martínez Cebrián, Madrid (ES)

(73) Assignee: Nielsen Consumer LLC, Chicago, IL (US)

( * ) Notice: Subject to any disclaimer, the term of this patent is extended or adjusted under 35 U.S.C. 154(b) by 0 days.

(21) Appl. No.: 18/476,978

(22) Filed: Sep. 28, 2023

(65) Prior Publication Data

US 2024/0144709 A1    May 2, 2024

Related U.S. Application Data

(63) Continuation of application No. 17/379,280, filed on Jul. 19, 2021, now abandoned.
(Continued)

(51) Int. Cl.
*G06V 30/148*    (2022.01)
*G06V 20/62*    (2022.01)
(Continued)

(52) U.S. Cl.
CPC ............ *G06V 30/153* (2022.01); *G06V 20/62* (2022.01); *G06V 20/70* (2022.01); *G06V 30/1448* (2022.01); *G06V 30/19173* (2022.01)

(58) Field of Classification Search
None
See application file for complete search history.

(56) References Cited

U.S. PATENT DOCUMENTS

| | | |
|---|---|---|
| 3,323,135 A | 6/1967 | Miller |
| 5,410,611 A | 4/1995 | Huttenlocher et al. |
| | (Continued) | |

FOREIGN PATENT DOCUMENTS

| | | |
|---|---|---|
| CA | 2957433 A1 | 9/2017 |
| CA | 2957433 C | 6/2020 |
| | (Continued) | |

OTHER PUBLICATIONS

Crandall, D.—"Extraction of special effects caption text events from digital video"—IJDARD 2003, pp. 138-157 (Year: 2003).*
(Continued)

*Primary Examiner* — Bernard Krasnic
(74) *Attorney, Agent, or Firm* — HANLEY, FLIGHT & ZIMMERMAN, LLC

(57) ABSTRACT

Methods, apparatus, systems, and articles of manufacture are disclosed to categorize image text. An example apparatus includes region detection model training circuitry to identify candidate regions in an input image that include text, and generate bounding boxes around respective ones of the identified candidate regions. The example apparatus also includes mask application circuitry to improve optical character recognition (OCR) by applying a mask to the input image, wherein the mask removes content of the input image except for portions of the input image within the bounding boxes, and OCR circuitry to perform OCR on the masked input image to obtain text data within the bounding boxes.

20 Claims, 14 Drawing Sheets

Related U.S. Application Data

(60) Provisional application No. 63/053,505, filed on Jul. 17, 2020.

(51) Int. Cl.
*G06V 20/70* (2022.01)
*G06V 30/14* (2022.01)
*G06V 30/19* (2022.01)

(56) References Cited

U.S. PATENT DOCUMENTS

| | | | |
|---|---|---|---|
| 5,606,690 | A | 2/1997 | Hunter |
| 7,454,063 | B1 | 11/2008 | Kneisl et al. |
| 7,792,709 | B1 | 9/2010 | Trandal |
| 8,285,047 | B2 | 10/2012 | Nagarajan et al. |
| 8,494,281 | B2 | 7/2013 | Nagarajan |
| 8,787,695 | B2 | 7/2014 | Wu |
| 8,792,141 | B2 | 7/2014 | Moore et al. |
| 8,983,170 | B2 | 3/2015 | Nepomniachtchi et al. |
| 9,014,432 | B2 | 4/2015 | Fan et al. |
| 9,158,744 | B2 | 10/2015 | Rao et al. |
| 9,239,952 | B2 | 1/2016 | Hsu |
| 9,262,686 | B1 | 2/2016 | Singer |
| 9,290,022 | B2 | 3/2016 | Makabe |
| 9,298,685 | B2 | 3/2016 | Barrus |
| 9,298,979 | B2 | 3/2016 | Nepomniachtchi et al. |
| 9,323,135 | B1 | 4/2016 | Veloso |
| 9,324,073 | B2 | 4/2016 | Nepomniachtchi et al. |
| 9,384,389 | B1 | 7/2016 | Sankaranarayanan |
| 9,384,839 | B2 | 7/2016 | Avila et al. |
| 9,396,540 | B1 | 7/2016 | Sampson |
| 9,684,842 | B2 | 6/2017 | Deng |
| 9,710,702 | B2 | 7/2017 | Nepomniachtchi et al. |
| 9,747,504 | B2 | 8/2017 | Ma et al. |
| 9,760,786 | B2 | 9/2017 | Sahagun et al. |
| 9,824,270 | B1 | 11/2017 | Mao |
| 9,875,385 | B1 | 1/2018 | Humphreys |
| 10,032,072 | B1 | 7/2018 | Tran et al. |
| 10,157,425 | B2 | 12/2018 | Chelst |
| 10,235,585 | B2 | 3/2019 | Deng |
| 10,242,285 | B2 | 3/2019 | Thrasher et al. |
| 10,395,772 | B1* | 8/2019 | Lucas .................... G16H 10/60 |
| 10,679,283 | B1 | 6/2020 | Pesce |
| 11,257,049 | B1 | 2/2022 | Durazo Almeida |
| 11,321,956 | B1 | 5/2022 | Geng |
| 11,410,446 | B2 | 8/2022 | Shanmuganathan et al. |
| 11,414,053 | B2 | 8/2022 | Tanaami et al. |
| 11,468,491 | B2 | 10/2022 | Dalal |
| 11,476,981 | B2 | 10/2022 | Wei et al. |
| 11,562,557 | B2 | 1/2023 | Miginnis et al. |
| 11,587,148 | B2 | 2/2023 | Elder |
| 11,593,552 | B2 | 2/2023 | Sarkar |
| 11,609,956 | B2 | 3/2023 | Jain |
| 11,625,930 | B2 | 4/2023 | Rodriguez et al. |
| 11,810,383 | B2 | 11/2023 | Patel et al. |
| 11,842,035 | B2 | 12/2023 | Jahjah et al. |
| 2002/0037097 | A1 | 3/2002 | Hoyos |
| 2003/0185448 | A1 | 10/2003 | Seeger et al. |
| 2006/0232619 | A1 | 10/2006 | Otsuka |
| 2007/0041642 | A1 | 2/2007 | Romanoff et al. |
| 2008/0205759 | A1 | 8/2008 | Zandifar et al. |
| 2009/0164422 | A1 | 6/2009 | Pacella |
| 2010/0306080 | A1 | 12/2010 | Trandal |
| 2011/0122443 | A1 | 5/2011 | Otsuka |
| 2011/0243445 | A1 | 10/2011 | Uzelac et al. |
| 2011/0289395 | A1 | 11/2011 | Breuel et al. |
| 2011/0311145 | A1 | 12/2011 | Bern |
| 2012/0183211 | A1 | 7/2012 | Hsu |
| 2012/0274953 | A1 | 11/2012 | Makabe |
| 2012/0330971 | A1 | 12/2012 | Thomas |
| 2013/0058575 | A1 | 3/2013 | Koo et al. |
| 2013/0170741 | A9 | 7/2013 | Hsu |
| 2014/0002868 | A1 | 1/2014 | Landa et al. |
| 2014/0064618 | A1 | 3/2014 | Janssen, Jr. |
| 2014/0188647 | A1 | 7/2014 | Argue |
| 2014/0195891 | A1 | 7/2014 | Venkata Radha Krishna Rao et al. |
| 2015/0039479 | A1 | 2/2015 | Gotanda |
| 2015/0127428 | A1 | 5/2015 | Gharachorloo |
| 2015/0169951 | A1 | 6/2015 | Khintsitskiy et al. |
| 2015/0254778 | A1 | 9/2015 | Kmak et al. |
| 2015/0317642 | A1 | 11/2015 | Argue |
| 2015/0363792 | A1 | 12/2015 | Arini |
| 2015/0363822 | A1 | 12/2015 | Rowe |
| 2016/0005189 | A1 | 1/2016 | Gray |
| 2016/0034863 | A1 | 2/2016 | Ross |
| 2016/0063469 | A1 | 3/2016 | Etzion |
| 2016/0125383 | A1 | 5/2016 | Chan |
| 2016/0171585 | A1 | 6/2016 | Singh |
| 2016/0203625 | A1 | 7/2016 | Khan et al. |
| 2016/0210507 | A1* | 7/2016 | Abdollahian ........ G06V 30/224 |
| 2016/0234431 | A1 | 8/2016 | Kraft et al. |
| 2016/0307059 | A1 | 10/2016 | Chaudhury et al. |
| 2016/0342863 | A1 | 11/2016 | Kwon et al. |
| 2017/0293819 | A1 | 10/2017 | Deng |
| 2018/0005345 | A1 | 1/2018 | Apodaca et al. |
| 2018/0053045 | A1 | 2/2018 | Lorenzini |
| 2018/0060302 | A1 | 3/2018 | Liang |
| 2018/0317116 | A1 | 11/2018 | Komissarov et al. |
| 2019/0026803 | A1 | 1/2019 | De Guzman |
| 2019/0050639 | A1 | 2/2019 | Ast |
| 2019/0080207 | A1 | 3/2019 | Chang |
| 2019/0171900 | A1 | 6/2019 | Thrasher |
| 2019/0244020 | A1 | 8/2019 | Yoshino et al. |
| 2019/0325211 | A1 | 10/2019 | Ordonez et al. |
| 2019/0332662 | A1 | 10/2019 | Middendorf |
| 2019/0354818 | A1 | 11/2019 | Reisswig |
| 2020/0097718 | A1 | 3/2020 | Schäfer |
| 2020/0142856 | A1 | 5/2020 | Neelamana |
| 2020/0151444 | A1 | 5/2020 | Price |
| 2020/0151902 | A1 | 5/2020 | Almazán |
| 2020/0175267 | A1 | 6/2020 | Schäfer |
| 2020/0249803 | A1 | 8/2020 | Sobel et al. |
| 2020/0364451 | A1* | 11/2020 | Ammar ................ G06V 10/768 |
| 2020/0401798 | A1 | 12/2020 | Foncubierta Rodriguez et al. |
| 2020/0410231 | A1 | 12/2020 | Chua |
| 2021/0004880 | A1 | 1/2021 | Benkreira et al. |
| 2021/0019287 | A1 | 1/2021 | Prasad et al. |
| 2021/0034856 | A1 | 2/2021 | Torres et al. |
| 2021/0090694 | A1* | 3/2021 | Colley .................... G16H 15/00 |
| 2021/0117665 | A1 | 4/2021 | Simantov |
| 2021/0117668 | A1 | 4/2021 | Zhong et al. |
| 2021/0142092 | A1 | 5/2021 | Zhao et al. |
| 2021/0149926 | A1 | 5/2021 | Komninos et al. |
| 2021/0158038 | A1 | 5/2021 | Shanmuganathan et al. |
| 2021/0216765 | A1 | 7/2021 | Xu |
| 2021/0248420 | A1 | 8/2021 | Zhong et al. |
| 2021/0295101 | A1 | 9/2021 | Tang et al. |
| 2021/0319217 | A1 | 10/2021 | Wang et al. |
| 2021/0334737 | A1 | 10/2021 | Balaji |
| 2021/0343030 | A1* | 11/2021 | Sagonas ...................... G06T 7/30 |
| 2021/0357710 | A1 | 11/2021 | Zhang et al. |
| 2021/0406533 | A1 | 12/2021 | Arroyo |
| 2022/0004756 | A1 | 1/2022 | Jennings |
| 2022/0114821 | A1 | 4/2022 | Arroyo et al. |
| 2022/0189190 | A1 | 6/2022 | Arroyo et al. |
| 2022/0198185 | A1 | 6/2022 | Prebble |
| 2022/0383651 | A1 | 12/2022 | Shanmuganathan |
| 2022/0397809 | A1 | 12/2022 | Talpade et al. |
| 2022/0414630 | A1 | 12/2022 | Yebes Torres et al. |
| 2023/0004748 | A1 | 1/2023 | Rodriguez et al. |
| 2023/0005286 | A1 | 1/2023 | Yebes Torres et al. |
| 2023/0008198 | A1 | 1/2023 | Gadde et al. |
| 2023/0196806 | A1 | 6/2023 | Ramalingam et al. |
| 2023/0214899 | A1 | 7/2023 | Cebrain |
| 2023/0230408 | A1 | 7/2023 | Arroyo et al. |
| 2023/0394859 | A1 | 12/2023 | Montero et al. |

FOREIGN PATENT DOCUMENTS

| | | |
|---|---|---|
| CN | 103123685 A | 5/2013 |
| CN | 104866849 A | 8/2015 |
| CN | 108229397 A | 6/2018 |
| CN | 108829397 A | 11/2018 |

(56) References Cited

FOREIGN PATENT DOCUMENTS

| | | | |
|---|---|---|---|
| CN | 109389124 A | 2/2019 |
| CN | 112446351 A | 3/2021 |
| CN | 112560862 A | 3/2021 |
| DE | 202013005144 U1 | 10/2013 |
| GB | 2595412 A | 11/2021 |
| JP | H0749529 A | 2/1995 |
| JP | 2008021850 A | 1/2008 |
| JP | 2008210850 A | 9/2008 |
| JP | 2008211850 A | 9/2008 |
| JP | 2019139737 A | 8/2019 |
| JP | 7049529 B2 | 4/2022 |
| KR | 101831204 B1 | 2/2018 |
| TW | 200821850 A | 5/2008 |
| WO | 2013041145 A1 | 3/2013 |
| WO | 2013044145 A1 | 3/2013 |
| WO | 2018054326 A1 | 3/2018 |
| WO | 2018201423 A1 | 11/2018 |
| WO | 2020194004 A1 | 10/2020 |
| WO | 2022006295 A1 | 1/2022 |
| WO | 2022123199 A1 | 6/2022 |

OTHER PUBLICATIONS

Levenshtein, "Binary Codes Capable of Correcting Deletions, Insertions, and Reversals," Soviet Physics—Doklady, Cybernetics and Control Theory, pp. 707-710, vol. 10, No. 8, Feb. 1966, 4 pages.

Smith et al., "Identification of Common Molecular Subsequences," Reprinted Journal of Molecular Biology, Academic Press Inc. (London) Ltd., pp. 195-197, dated 1981, 3 pages.

Govindan et al., "Character Recognition—A Review," Pattern Recognition, vol. 23, No. 7, pp. 671-683, Jul. 1990, 13 pages.

Poulovassilis et al. "A Nested-Graph Model for the Representation and Manipulation of Complex Objects," ACM Transactions on Information Systems, vol. 12, No. 1, dated Jan. 1994, 34 pages.

Hochreiter et al., "Long Short-Term Memory," communicated by Ronald Williams, Neural Computation, (1997):1735-1780, 46 pages.

Ng et al., "On Spectral Clustering: Analysis and an Algorithm," NIPS'01: Proceedings of the 14th International Conference on Neural Information Processing Systems: Natural and Synthetic, Jan. 2001, 8 pages.

Crandall et al., "Extraction of special effects caption text events from digital video," IJDAR, Department of Computer Science and Engineering, The Pennsylvania State University, accepted Sep. 13, 2002, 20 pages.

Lowe, "Distinctive Image Features from Scale-Invariant Key points," International Journal of Computer Vision (HCV), published Jan. 5, 2004, 20 pages.

Marinai, "Introduction to Document Analysis and Recognition," Machine Learning in Document Analysis and Recognition, published 2008, 20 pages.

Vogel et al., "Parallel Implementations of Word Alignment Tool," Software Engineering, Testing, and Quality Assurance for Natural Language Processing, pp. 49-57, Jun. 2008, 10 pages.

O'Gorman et al., "Document Image Analysis," IEEE Computer Society Executive Briefings, dated 2009, 125 pages.

Oliveira et al., "A New Method for Text-Line Segmentation for Warped Documents," International Conference Image Analysis and Recognition, Jun. 21, 2010, 11 pages.

Krizhevsky et al., "ImageNet Classification with Deep Convolutional Neural Networks," In International Conference on Neural Information Processing Systems (NIPS), published 2012, 9 pages.

Chung et al., "Empirical Evaluation of Gated Recurrent Neural Networks on Sequence Modeling," ArXiv abs/1412.3555, dated Dec. 11, 2024, 9 pages.

Nshuti, "Mobile Scanner and OCR (A First Step Towards Receipt to Spreadsheet)," published 2015, 3 pages.

Ronneberger et al., "U-Net: Convolutional Networks for Biomedical Image Segmentation," Medical Image Computing and Computer-Assisted Intervention (MICCAI), dated May 18, 2015, 8 pages.

Lecun et al., "Deep Learning," Review, Nature, vol. 521, pp. 436-444, dated May 28, 2015, 9 pages.

Genereux et al., "NLP Challenges in Dealing with OCR-ed Documents of Derogated Quality," Workshop on Replicability and Reproducibility in Natural Language Processing, IJCAI 2015, dated Jul. 2015, 6 pages.

Ren et al., "Faster R-CNN: Towards Real-Time Object Detection with Region Proposal Networks," In International Conference on Neural Information Processing Systems (NIPS), pp. 91-99, dated Jan. 6, 2016, 14 pages.

Kim et al., "Character-Aware Neural Language Models," Proceedings of the Thirtieth AAAI Conference on Artificial Intelligence (AAAI'IO), pp. 2741-2749, Dec. 1, 2015, 9 pages.

Redmon et al., "You Only Look Once: Unified, Real-Time Object Detection," In Conference on Computer Vision and Pattern Recognition (CVPR), dated May 9, 2016, 10 pages.

Osindero et al., "Recursive Recurrent Nets with Attention Modeling for OCR in the Wild," in Conference on Computer Vision and Pattern Recollection (CVPR), Mar. 9, 2016, 10 pages.

Joulin et al., "Bag of Tricks for Efficient Text Classification," In Proceedings of the 15th Conference of the European Chapter of the Association for Computational Linguistics, dated Aug. 9, 2016, 5 pages.

Konda et al., "Magellan: Toward Building Entity Matching Management Systems Over Data Science Stacks," Proceedings of the VLDB Endowment, vol. 9, No. 13, 2016, 4 pages.

Kipf et al., "Semi-Supervised Classification with Graph Convolutional Networks," 5th International Conference on Learning Representations, Feb. 22, 2017, 14 Pages.

Ozhiganov, "Deep Dive Into OCR for Receipt Recognition," DZone, Jun. 21, 2017, 18 pages.

Bojanowski et al., "Enriching Word Vectors with Subword Information," In Journal Transactions of the Association for Computational Linwstics, 2017, vol. 5, pp. 135-146, dated Jun. 2017, 12 pages.

Bartz et at., "STN-OCT: A Single Neural Network for Text Detection and Text Recognition," Computer Vision and Pattern Recognition, dated Jul. 27, 2017, 9 pages.

Vaswani et al., "Attention is all you need," In Advances in Neural Information Processing Systems, 31st Conference on Neural Information Processing Systems (NIPS 2017), Long Beach, CA, last revised Dec. 6, 2017, 15 pages.

Hui, "mAP (mean Average Precision) for Object Detection," Mar. 6, 2018, 2 pages. Retrieved from [https://medium.eom/@jonathan hui/map-mean-average-precision-for-object-detection-45cl21a311731 on Mar. 6, 2018, 2 pages.

Velickovic et al., "Graph Attention Networks," International Conference on Learning Representations, Feb. 4, 2018, 12 pages.

Mudgal et al., "Deep learning for entity matching: A design space exploration," in Proceedings of the 2018 International Conference on Management of Data, dated Jun. 10-15, 2018, 16 pages.

Wick et al., "Calamari—A High-Performance Tensorflow-based Deep Learning Package for Optical Character Recognition," Digital Humanities Quarterly, Jul. 5, 2018, 12 pages. [retrieved from: https://arxiv.org/ftp/arxiv/ papers/1807/1807.02004.pdf].

Akbik et al., "Contextual String Embeddings for Sequence Labeling," In Proceedings of the 27th International Conference on Computational Linguistics (COLING), dated Aug. 2018, 12 pages.

Follmann et al., "MVTec D2S: Densely Segmented Supermarket Dataset," In European Conference on Computer Vision (ECCV), dated 2018, 17 pages.

Ray et al., "U-PC: Unsupervised Planogram Compliance," in European Conference on Computer Vision (ECCV), 2018, 15 pages. [retrieved from:http://openaccess.thecvf.com/content_ECCV_2018/papers/Archan_Ray_U-PC_Unsupervised Planogram ECCV 2018 paper.pdf].

Li et al., "Extracting Figures and Captions from Scientific Publications," Short Paper, CIKM18, Oct. 22-26, 2018, Torino, Italy, 4 pages.

Elfwing et al., "Sigmoid-Weighted Linear Units for Neural Network Function Approximation in Reinforcement Learning," Neural Networks: Journal of the International Neural Network Society, vol. 107, Nov. 2, 2017, 18 pages.

(56) References Cited

OTHER PUBLICATIONS

Huang et al., "Mask R-CNN with Pyramid Attention Network for Scene Text Detection", arXiv:1811.09058v1, pp. 1-9, https://arxiv.org/abs/1811.09058, Nov. 22, 2018, 9 pages.
Wikipedia, "Precision & Recall," Dec. 17, 2018 revision, 12 pages.
Artificial Intelligence & Image Analysis, "Intelligent Automation Eliminates Manual Data Entry From Complex Documents," White Paper, accessed on Jan. 30, 2019, 3 pages.
Artificial Intelligence & Image Analysis, "Historic Document Conversion," Industry Paper, accessed on Jan. 30, 2019, 4 pages.
Loshchilov et al., "Decoupled Weight Decay Regularization," 2019 International Conference on Learning Representations, Jan. 4, 2019, 19 pages.
Nathancy, "How do I make masks to set all of image background, except the text, to white?", stakoverflow.com, https://stackoverflow.com/questions/56465359/how-do-i-make-masks-to-set-all-of-image-background-except-the-text-to-white, Jun. 5, 2019, 5 pages.
Devlin et al., "BERT: Pre-training of Deep Bidirectional Transformers for Language Understanding," In Conference of the North American Chapter of the Association for Computational Linguistics (NAACL-HLT), dated May 24, 2019, 16 pages.
Qasim et al., "Rethinking Table Recognition using Graph Neural Networks," In Inernational Conference on Document Analysis and Recognition (ICDAR), dated Jul. 3, 2019, 6 pages.
Feng et al., "Computer vision algorithms and hardware implementations: A survey," Integration: the VLSI Journal, vol. 69, pp. 309-320, dated Jul. 27, 2019, 12 pages.
Hu et al., "Hierarchical Graph Convolutional Networks for Semi-supervised Node Classification," 2019 International Joint Conference on Artificial Intelligence, Jun. 10, 2019, 8 pages.
Oliveira et al., "dhSegment: A generic deep-learning approach for document segmentation," In 16th International Conference on Frontiers in Handwriting Recollection (ICFHR), Aug. 14, 2019, 6 pages.
Zhong et al., "PubLayNet: largest dataset ever for document layout analysis," In International Conference on Document Analysis and Recognition (ICDAR), dated Aug. 16, 2019, 8 pages.
Jaume et al., "FUNSD: A Dataset for Form Understanding in Noisy Scanned Documents," International Conference on Document Analysis and Recognition (ICDAR), Oct. 29, 2019, 6 pages.
Yadati et al., "HyperGCN: Hypergraph Convolutional Networks for Semi-Supervised Classification," Proceedings of the 33rd International Conference on Neural Information Processing Systems, Jan. 26, 2019, 18 pages.
International Searching Authority, "Written Opinion of the International Searching Authority", issued in connection with International Patent Application No. PCT/IB2019/000299, dated Dec. 23, 2019, 4 Pages.
International Searching Authority, "International Search Report," issued in connection with International Patent Application No. PCT/IB2019/000299, on Dec. 23, 2019, 3 pages.
Github, "Tesseract OCR," Tesseract Repository on GitHub, retrieved from: https://github.com/tesseract-ocr/, dated 2020, 3 pages.
Carbonell et al., "Named Entity Recognition and Relation Extraction with Graph Neural Networks in Semi Structured Documents," 2020 International Conference on Pattern Recognition (ICPR), 6 pages.
Zacharias et al., "Image Processing Based Scene-Text Detection and Recognition withTesseract," arXiv (CoRR), Apr. 17, 2020, 6 pages. [retrieved from: https://arxiv.org/pdf/2004.08079.pdf].
Liu et al. "RoBERTa: A Robustly Optimized BERT Pretraining Approach," International Conference on Learning Representations, Jul. 26, 2019, 13 pages.
Xu et al., "LayoutLM: Pre-training of Text and Layout for Document Image Understanding," in International Conference on Knowledge Discovery & Data Mining (SIGKDD), Jun. 16, 2020, 9 pages. [retrieved from: https://arxiv.org/pdf/1912.13318.pdf].
Dong et al. "HNHN: Hypergraph Networks with Hyperedge Neurons," ArXiv abs/2006.12278, dated Jun. 22, 2020, 11 pages.
Yu et al., "PICK: Processing Key Information Extraction from Documents using Improved Graph Learning-Convolutional Networks," in International Conference on Pattern Recognition (ICPR), Jul. 18, 2020, 8 pages. [retrieved from: https://arxiv.org/pdf/2004.07464.pdf].
Chen et al., "HGMF: Heterogeneous Graph-Based Fusion for Multimodal Data with Incompleteness," Research Track Paper, Proceedings of the 26th ACM SIGKDD International Conference on Knowledge Discovery & Data Mining, dated Aug. 23-27, 2020, 11 pages.
Wang et al., "DocStruct: A Multimodal Method to Extract Hierarchy Structure in Document for General Form Understanding," 2020 Conference Empirical Methods in Natural Language Processing (EMNLP), Nov. 16-20, 2020, 11 pages.
Zhu et al., "Heterogeneous Mini-Graph Neural Network and Its Application to Fraud Invitation Detection," 2020 IEEE International Conference on Data Mining (ICDM), downloaded on May 18, 2021, 9 pages.
Bandyopadhyay et al., "Hypergraph Attention Isomorphism Network by Learning Line Graph Expansion," 2020 IEEE International Conference on Big Data (Big Data) (2020): 669-678, downloaded on May 29, 2021, 10 pages.
Arroyo et al., "Multi-label classification of promotions in digital leaflets using textual and visual information," Proceedings of the Workshop on Natural Language Processing in E-Commerce (EComNLP), pp. 11-20, Barcelona, Spain (Online), Dec. 12, 2020, 10 pages.
Deepdive, "Distant Supervision," Online available on Stanford University website, retrieved on Apr. 1, 2022, 2 pages, [retrieved from: http://deepdive.stanford.edu/distant supervision].
Nguyen et al., "End-to-End Hierarchical Relation Extraction for Generic Form Understanding", in International Conference on Pattern Recognition (ICPR), Jun. 2, 2021, 8 pages.
International Searching Authority, "Written Opinion," issued in connection with International Patent Application No. PCT/US2020/061269, mailed on Mar. 11, 2021, 4 Pages.
International Searching Authority, "International Search Report," issued in connection with International Patent Application No. PCT/US2020/061269, mailed on Mar. 11, 2021, 3 pages.
United States Patent and Trademark Office, "Non-Final Office Action," issued in connection with U.S. Appl. No. 16/692,797, dated Mar. 16, 2021, 12 pages.
Google, "Detect Text in Images," Mar. 29, 2021, 16 pages. Retrieved from http://cloud.google.com/vision/docs/ocr.
Xu et al. "LayoutXLM: Multimodal Pre-training for Multilingual Visually-rich Document Understanding", arXiv, Sep. 9, 2021, 10 pages.
Ma et al., "Graph Attention Networks with Positional Embeddings," Pacific-Asia Conference on Knowledge Discovery and Data Mining, Oct. 24, 2021, 13 pages.
Chen et al., "TextPolar: irregular scene text detection using polar representation," International Journal on Document Analysis and Recognition (IJDAR), May 7, 2021, 9 pages.
Li et al., "SelfDoc: Self-Supervised Document Representation Learning," 2021 IEEE/CVF Conference on Computer Vision and Pattern Recognition (CVPR), Jun. 7, 2021, 10 pages.
Hwang et al., "Spatial Dependency Parsing for Semi-Structured Document Information Extraction," in International Joint Conference on Natural Language Processing (IJCNLP), Jul. 1, 2021, 14 pages. [retrieved from: https://arxiv.org/ pdf/2005.00642.pdf].
Xu et al., "LayoutLMv2: Multi-modal Pre-training for Visually-rich Document Understanding," 59th Annual Meeting of the Association for Computational Linguistics (ACL), arXiv, dated Jan. 10, 2022, 13 pages.
Li et al., "StructuralLM: Structural Pre-training for Form Understanding," 59th Annual Meeting of the Association for Computational Linguistics, May 24, 2021, 10 pages.
Huang et al. "UniGNN: a Unified Framework for Graph and Hypergraph Neural Networks," 30th International Joint Conference on Artificial Intelligence (IJCAI), May 3, 2021, 9 pages.
Tang et al., "MatchVIE: Exploiting Match Relevancy between Entities for Visual Information Extraction", in International Joint Conference on Artificial Intelligence (IJCAI), pp. 1039-1045, 2021, 7 pages.

(56) References Cited

OTHER PUBLICATIONS

Qian et al., "A Region-Based Hypergraph Network for Joint Entity-Relation Extraction," Knowledge-Based Systems. vol. 228, Sep. 27, 2021, 8 pages.

Powalski et al., "Going Full-TILT Boogie on Document Understanding with Text-Image-Layout Transformer," International Conference on Document Analysis and Recognition, Mar. 2, 2021, 17 pages.

Davis et al., "Visual FUDGE: Form Understanding via Dynamic Graph Editing," International Conference on Document Analysis and Recognition (ICDAR), Jul. 16, 2021, 16 pages.

Prabhu et al., "MTL-FoUn: A Multi-Task Learning Approach to Form Understanding," 2021 International Conference on Document Analysis and Recognition (ICDAR), Sep. 5, 2021, 5 pages.

Garncarek et al., "LAMBERT: Layout-Aware Language Modeling for Information Extraction," International Conference on Document Analysis and Recognition (ICDAR), May 28, 2021, 16 pages.

Shen et al., "LayoutParser: A Unified Toolkit for Deep Learning Based Document Image Analysis," in International Conference on Document Analysis and Recognition (ICDAR), Jun. 21, 2021, 16 pages. [retrieved from: https://arxiv.org/pdf/2103.15348.pdf].

Hong et al., "BROS: A Pre-trained Language Model Focusing on Text and Layout for Better Key Information Extraction from Documents," arXiv (CoRR), Sep. 10, 2021, 13 pages. [retrieved from:https://arxiv.org/pdf/2108.04539.pdf].

Appalaraju et al., "DocFormer: End-to-End Transformer for Document Understanding," arXiv (CoRR), Sep. 20, 2021, 22 pages. [retrieved from: https://arxiv .org/pdf/2106 .11539.pdf].

International Searching Authority, "International Preliminary Report on Patentability," issued in connection with International Patent Application No. PCT/IB2019/000299, dated Sep. 28, 2021, 5 Pages.

United States Patent and Trademark Office, "Final Office Action," issued in connection with U.S. Appl. No. 16/692,797, dated Oct. 27, 2021, 14 pages.

International Searching Authority, "International Search Report," issued in connection with International Patent Application No. PCT/US2021/039931, mailed on Nov. 4, 2021, 3 pages.

International Searching Authority, "Written Opinion," issued in connection with International Patent Application No. PCT/US2021/039931, mailed on Nov. 4, 2021, 4 pages.

International Searching Authority, "Search Report," issued in connection with Application No. PCT/US2021/039931, dated Nov. 4, 2021, 4 pages.

International Searching Authority, "Written Opinion," issued in connection with Application No. PCT/US2021/039931, dated Nov. 4, 2021, 4 pages.

European Patent Office, "Communication pursuant to Rules 161(2) and 162 EPC," in connection with European Patent Application No. 19921870.2, issued Nov. 5, 2021, 3 pages.

Zhang et al., "Entity Relation Extraction as Dependency Parsing in Visually Rich Documents," Empirical Methods in Natural Language Processing (EMNLP), Nov. 7-11, 2021, 10 pages.

Hwang et al., "Cost-Effective End-to-end Information Extraction for Semi-structured Document Images," Empirical Methods in Natural Language Processing (EMNLP), Aug. 30, 2021, 9 pages.

Li et al., "StrucTexT: Structured Text Understanding with Multi-Modal Transformers", in ACM International Conference on Multimedia (ACM Multimedia), pp. 1912-1920., arXiv, dated Nov. 8, 2021, 9 pages.

Leicester et al., "Using Scanner Technology to Collect Expenditure Data," Fiscal Studies, vol. 30, Issue 3-4, 2009, 29 pages.

United States Patent and Trademark Office, "Notice of Allowance and Fee(s) Due," issued in connection with U.S. Appl. No. 17/710,538, dated Apr. 19, 2024, 8 pages.

United States Patent and Trademark Office, "Non-Final Office Action," issued in connection with U.S. Appl. No. 17/710,660, dated May 28, 2024, 9 pages.

Canadian Intellectual Property Office, "Office Action," issued in connection with Canadian Patent Application No. 3,182,471, dated May 28, 2024, 5 pages.

Datasetlist, "Annotation tools for building datasets," Labeling tools-List of labeling tools, Datasetlist.com, updated Dec. 2021, downloaded on Apr. 1, 2022, 12 pages. [retrieved from: https://www.datasetlist.com/tools/].

Gu et al., "UniDoc: Unified Pretraining Framework for Document Understanding," 35th Conference on Neural Information Processing Systems (NeurIPS 2021), Dec. 6, 2021, 12 pages.

Wang et al., "LiLT: A Simple yet Effective Language-Independent Layout Transformer for Structured Document Understanding," in Annual Meeting of the Association for Computational Linguistics (ACL), Feb. 28, 2022, 11 pages.

Park et al., "CORD: A Consolidated Receipt Dataset for Post-OCR Parsing," 33rd Conference on Neural Information Processing Systems (NeurIPS 2019), Vancouver, Canada, 4 pages.

United States Patent and Trademark Office, "Advisory Action," issued in connection with U.S. Appl. No. 16/692,797, dated Feb. 16, 2022, 4 pages.

Github, "FIAT tool—Fast Image Data Annotation Tool," Github.com, downloaded on Apr. 1, 2022, 30 pages, [retrieved from: https://github.com/christopher5106/FastAimotationTooll.

NielsenIQ Brandbank, "Nielsen Brandbank Product Library," Online Available. Retrieved on Apr. 1, 2022, 5 pages. [retrieved from: https://www.brandbank.com/us/product-librarv/].

Github, "Doccano tool," Github.com, downloaded on Apr. 1, 2022, 12 pages. [retrieved from:https://github.com/doccano/doccano].

United States Patent and Trademark Office, "Notice of Allowance and Fee(s) Due," issued in connection with U.S. Appl. No. 16/692,797, dated Apr. 5, 2022, 10 pages.

United States Patent and Trademark Office, "Corrected Notice of Allowability," issued in connection with U.S. Appl. No. 16/692,797, dated Apr. 22, 2022, 3 pages.

International Searching Authority, "International Preliminary Report on Patentability," mailed in connection with International Patent Application No. PCT/US2020/061269, on May 17, 2022, 5 pages.

European Patent Office, "Information regarding early processing before the European Patent Office," issued in connection with European Patent Application No. 20891012.5-1218, May 20, 2022, 2 pages.

European Patent Office, "Communication concerning corrected entries of the applicant/ patent proprietor," issued in connection with European Patent Application No. 20891012.5-1218, May 31, 2022, 1 page.

International Searching Authority, "International Preliminary Report on Patentability," issued in connection with International Patent Application No. PCT/US2020/061269, dated May 17, 2022, 5 Pages.

Gu et al., "XYLayoutLM: Towards Layout-Aware Multimodal Networks For Visually-Rich Document Understanding," Conference on Computer Vision and Pattern Recognition (CVPR), Jun. 18, 2022, 10 pages.

International Searching Authority, "Written Opinion," issued in connection with International Patent Application No. PCT/US2022/034570, dated Jun. 22, 2022, 5 pages.

International Searching Authority, "International Search Report," issued in connection with International Patent Application No. PCT/US2022/034570, dated Jun. 22, 2022, 3 pages.

European Patent Office, "Communication pursuant to Rules 161(2) and 162 EPC," issued in connection with European Patent Application No. 20891012.5-1218, dated Jun. 29, 2022, 3 pages.

Datasetlist, "A tool using OpenCV to annotate images for image classification, optical character reading, . . . ," Datasetlist.com, dated Jul. 13, 2022, 30 pages.

Mllota et al., "Text Classification Models for Form Entity Linking," International Symposium on Distributed Computing and Artificial Intelligence, Dec. 14, 2021, 10 pages.

United States Patent and Trademark Office, "Non-Final Office Action," issued in connection with U.S. Appl. No. 17/345,940, dated Aug. 18, 2022, 8 pages.

United States Patent and Trademark Office, "Non-Final Office Action", issued in connection with U.S. Appl. No. 17/075,675, dated Sep. 22, 2022, 12 Pages.

(56) References Cited

OTHER PUBLICATIONS

Huang et al., "LayoutLMv3: Pre-training for Document AI with Unified Text and Image Masking, " 30th ACM International Conference on Multimedia, Jul. 19, 2022, 10 pages.

Zhang et al., "Multimodal Pre-training Based on Graph Attention Network for Document Understanding," IEEE Transactions on Multimedia, vol. 25, Oct. 23, 2022, 13 pages.

European Patent Office, "Extended European Search Report," issued in connection with European Patent Application No. 19921870, dated Oct. 12, 2022, 11 pages.

International Searching Authority, "Written Opinion," issued in connection with International Patent Application No. PCT/US2022/034570, mailed on Oct. 20, 2022, 5 pages.

International Searching Authority, "International Search Report," issued in connection with International Patent Application No. PCT/US2022/034570, mailed on Oct. 20, 2022, 3 pages.

Kim et al., "Donut: Document Understanding Transformer without OCR", arXiv, dated Oct. 6, 2022, 29 pages.

Mexican Institute of Industrial Property, "Representation of the Promotion Sent Through the Online Patent System," issued in connection with Mexican Patent Application No. MX/a/2022/008170, dated Oct. 27, 2022, 35 pages. [Partial English language machine translation included.]

European Patent Office, "Communication pursuant to Rules 70(2) and 70a(2) EPC," issued in connection with Application No. 19921870.2, dated Nov. 2, 2022, 1 page.

United States Patent and Trademark Office, "Notice of Allowance and Fee(s) Due," issued in connection with U.S. Appl. No. 17/364,419, dated Nov. 4, 2022, 10 pages.

Canadian Patent Office, "Examiner's Report," issued in connection with Canadian Patent Application No. 3, 124,868, dated Nov. 10, 2022, 4 pages.

United States Patent and Trademark Office, "Corrected Notice of Allowability," issued in connection with U.S. Appl. No. 17/364,419, dated Nov. 15, 2022, 2 pages.

Zhong et al., "Hierarchical Message-Passing Graph Neural Networks," Data Mining and Knowledge Discovery, Nov. 17, 2022, 29 pages.

European Patent Office, "European Search Report," issued in connection with European Patent Application No. 22180113.7-1207, dated Nov. 22, 2022, 25 pages.

European Patent Office, "Extended Search Report," in connection with European Patent Application No. 22180113.7, dated Nov. 22, 2022, 2 pages.

Dwivedi et al., "Benchmarking Graph Neural Networks," Journal of Machine Learning Research, Dec. 28, 2022, 49 pages.

European Patent Office, "Extended European Search Report," issued in connection with European Patent Application No. 22184405.3, dated Dec. 2, 2022, 7 pages.

United States Patent and Trademark Office, "Non-Final Office Action," issued in connection with U.S. Appl. No. 17/379,280, dated Dec. 2, 2022, 14 Pages.

International Searching Authority, "International Preliminary Report on Patentability," issued in connection with PCT Application No. PCT/US2021/039931, dated Dec. 13, 2022, 5 pages.

United States Patent and Trademark Office, "Corrected Notice of Allowability," issued in connection with U.S. Appl. No. 17/364,419, dated Jan. 4, 2023, 2 pages.

European Patent Office, "Communication Pursuant to Rule 69 EPC," issued in connection with European Patent Application No. 22180113.7, dated Jan. 10, 2023, 2 pages.

International Searching Authority, "International Preliminary Report on Patentability," issued in connection with PCT Application No. PCT/US2021/039931, dated Jan. 12, 2023, 6 pages.

United States Patent and Trademark Office, "Non-Final Office Action," issued in connection with U.S. Appl. No. 17/883,309, dated Jan. 20, 2023, 14 pages.

European Patent Office, "Communication pursuant to Rule 69 EPC," in connection with European Patent Application No. 22184405.3, dated Jan. 23, 2023, 2 pages.

United States Patent and Trademark Office, "Corrected Notice of Allowability", issued in connection with U.S. Appl. No. 17/364,419, dated Feb. 15, 2023, 2 pages.

United Kingdom Patent Office, "Examination Report under section 18(3)," issued in connection with GB Application No. 2112299.9, dated Feb. 17, 2023, 2 pages.

United States Patent and Trademark Office, "Final Office Action," issued in connection with U.S. Appl. No. 17/075,675, dated Mar. 7, 2023, 11 Pages.

United States Patent and Trademark Office, "Non-Final Office Action," issued in connection with U.S. Appl. No. 17/345,940, dated Mar. 16, 2023, 13 pages.

United States Patent and Trademark Office, "Final Office Action," issued in connection with U.S. Appl. No. 17/379,280, dated May 5, 2023, 17 pages.

United States Patent and Trademark Office, "Notice of Allowance and Fee(s) Due," issued in connection with U.S. Appl. No. 17/883,309, dated May 11, 2023, 9 pages.

European Patent Office, "Extended European Search Report," issued in connection with European Patent Application No. 22214553.4, dated May 17, 2023, 9 pages.

United States Patent and Trademark Office, "Advisory Action," issued in connection with U.S. Appl. No. 17/075,675, issued May 30, 2023, 3 pages.

International Searching Authority, "International Search Report," issued in connection with International Patent Application No. PCT/US2023/011859, mailed on Jun. 1, 2023, 3 pages.

International Searching Authority, "Written Opinion," issued in connection with International Patent Application No. PCT/US2023/011859, mailed on Jun. 1, 2023, 4 pages.

United States Patent and Trademark Office, "Notice of Allowance and Fee(s) Due," issued in connection with U.S. Appl. No. 17/075,675, issued Jun. 26, 2023, 8 pages.

United States Patent and Trademark Office, "Notice of Allowance and Fee(s) Due," issued in connection with U.S. Appl. No. 17/345,940, mailed on Jul. 7, 2023, 8 pages.

Intellectual Property of United Kingdom, "Intention to Grant under Section 18(4)," issued in connection with United Kingdom Patent Application No. 2112299.9, mailed on Jul. 13, 2023, 2 Pages.

United States Patent and Trademark Office, "Advisory Action," issued in connection with U.S. Appl. No. 17/379,280, mailed on Jul. 18, 2023, 3 pages.

Gopal et al., "What is Intelligent Document Processing?" Nano Net Technologies, URL:[https://nanonets.com/blog/intelligent-document-processing/], Jul. 19, 2023, 21 pages.

United States Patent and Trademark Office, "Corrected Notice of Allowability," issued in connection with U.S. Appl. No. 17/345,940, dated Jul. 20, 2023, 3 pages.

Canadian Intellectual Property Office, "Examiner's Report," issued in connection with Canadian Patent Application No. 3, 124,868, dated Aug. 10, 2023, 5 pages.

United States Patent and Trademark Office, "Corrected Notice of Allowability," issued in connection with U.S. Appl. No. 17/883,309, mailed on Aug. 17, 2023, 2 Pages.

Intellectual Property of United Kingdom, "Notification of Grant ," issued in connection with United Kingdom Patent Application No. 2112299.9, mailed on Aug. 29, 2023, 2 Pages.

Amazon, "Intelligent Document Processing," Amazon Web Services, https://aws.amazon.com/machine-learning/ml-use-cases/document-processing/fintech/, retrieved on Sep. 8, 2023, 6 pages.

United States Patent and Trademark Office, "Corrected Notice of Allowability," issued in connection with U.S. Appl. No. 17/075,675, mailed on Oct. 10, 2023, 2 pages.

United States Patent and Trademark Office, "Corrected Notice of Allowability," issued in U.S. Appl. No. 17/075,675, dated on Oct. 10, 2023, 2 pages.

United States Patent and Trademark Office, "Non-Final Office Action, " issued in connection with U.S. Appl. No. 17/710,538, dated Oct. 26, 2023, 6 Pages.

European Patent Office, "Extended European Search Report," issued in connection with European Patent Application No. 20891012.5, dated Nov. 17, 2023, 12 pages.

(56) References Cited

OTHER PUBLICATIONS

European Patent Office, "Communication pursuant to Rules 70(2) and 70a(2) EPC," issued in connection with European Patent Application No. 20891012.5, dated Dec. 5, 2023, 1 page.

International Searching Authority, "International Preliminary Report on Patentability," issued in connection with International Patent Application No. PCT/US2022/034570, issued on Dec. 14, 2023, 7 pages.

United States Patent and Trademark Office, "Non-Final Office Action," issued in connection with U.S. Appl. No. 17/598,792, dated Dec. 29, 2023, 17 pages.

United States and Patent and Trademark Office, "Non-Final Office Action," issued in connection with U.S. Appl. No. 17/566, 135, dated Mar. 27, 2024, 13 pages.

United States Patent and Trademark Office, "Non-Final Office Action," issued in connection with U.S. Appl. No. 18/191,642, dated Feb. 7, 2024, 18 pages.

International Searching Authority, "International Preliminary Report on Patentability," issued in connection with International Application No. PCT/US2023/011859, mailed on Aug. 6, 2024, 5 pages.

United States Patent and Trademark Office, "Notice of Allowance and Fee(s) Due," issued in connection with U.S. Appl. No. 17/710,538, dated Aug. 14, 2024, 8 pages.

United States Patent and Trademark Office, "Notice of Allowance and Fee(s) Due," issued in connection with U.S. Appl. No. 17/598,792, dated Aug. 27, 2024, 9 pages.

United States Patent and Trademark Office, "Notice of Allowance and Fee(s) Due," issued in connection with U.S. Appl. No. 18/191,642, dated Aug. 28, 2024, 7 pages.

United States Patent and Trademark Office, "Non-Final Office Action," issued in connection with U.S. Appl. No. 17/710,649, dated Sep. 16, 2024, 12 pages.

Visich, "Bar Codes and Their Applications," Research Foundation of State University of New York, 1990, 59 pages.

European Patent Office, "Communication pursuant to Article 94(3) EPC," issued in connection with European Patent Application No. 19 921 870.2-1207, on Apr. 9, 2024, 7 pages.

United States Patent and Trademark Office, "Supplemental Notice of Allowability," issued in connection with U.S. Appl. No. 17/710,538, dated May 8, 2024, 3 pages.

United States Patent and Trademark Office, "Notice of Allowance and Fee(s) Due," issued in connection with U.S. Appl. No. 17/598,792, dated Jun. 17, 2024, 9 pages.

United States Patent and Trademark Office, "Notice of Allowance and Fee(s) Due," issued in connection with U.S. Appl. No. 18/191,642, dated Jun. 17, 2024, 9 pages.

United States Patent and Trademark Office, "Corrected Notice of Allowability," issued in connection with U.S. Appl. No. 17/598,792, dated Jul. 3, 2024, 2 pages.

United States Patent and Trademark Office, "Final Office Action," issued in connection with U.S. Appl. No. 17/566,135, dated Jul. 25, 2024, 17 pages.

United States Patent and Trademark Office, "Supplemental Notice of Allowability," issued in connection with U.S. Appl. No. 17/710,538, dated Sep. 11, 2024, 3 pages.

United States Patent and Trademark Office, "Notice of Allowance and Fee(s) Due," issued in connection with U.S. Appl. No. 17/710,660, dated Sep. 25, 2024, 9 pages.

United States Patent and Trademark Office, "Notice of Allowance and Fee(s) Due," issued in connection with U.S. Appl. No. 17/566,135, dated Oct. 11, 2024, 9 pages.

\* cited by examiner

METHODS, SYSTEMS, ARTICLES OF MANUFACTURE AND APPARATUS TO CATEGORIZE IMAGE TEXT

RELATED APPLICATION

This patent arises from a continuation of U.S. Patent Application Ser. No. 17/379,280, filed Jul. 19, 2021, which arises from U.S. Provisional Patent Application Ser. No. 63/053,505, which was filed on Jul. 17, 2020. U.S. patent application Ser. No. 17/379,280 and U.S. Provisional Patent Application No. 63/053,505 are hereby incorporated herein by reference in their entireties. Priority to U.S. Patent Application Ser. No. 17/379,280 and U.S. Provisional Patent Application No. 63/053,505 is hereby claimed.

FIELD OF THE DISCLOSURE

This disclosure relates generally to computer-based image analysis and, more particularly, to methods, systems, articles of manufacture and apparatus to categorize image text.

BACKGROUND

Image recognition involves computer-aided techniques to analyze pictures or photographs to determine and/or identify the content of the captured scene (e.g., the recognition of the general subject matter of the scene and/or the recognition of individual objects within the scene). Such techniques are useful in different applications across different industries. For example, retail establishments, product manufacturers, and other business establishments may take advantage of image recognition techniques of photographs of such establishments (e.g., pictures of product shelving) to identify quantities and/or types of products in inventory, to identify shelves that need to be restocked and/or the frequency with which products need restocking, to recognize and read product barcodes or textual information about the product, to assess product arrangements and displays, etc.

Figure 1:
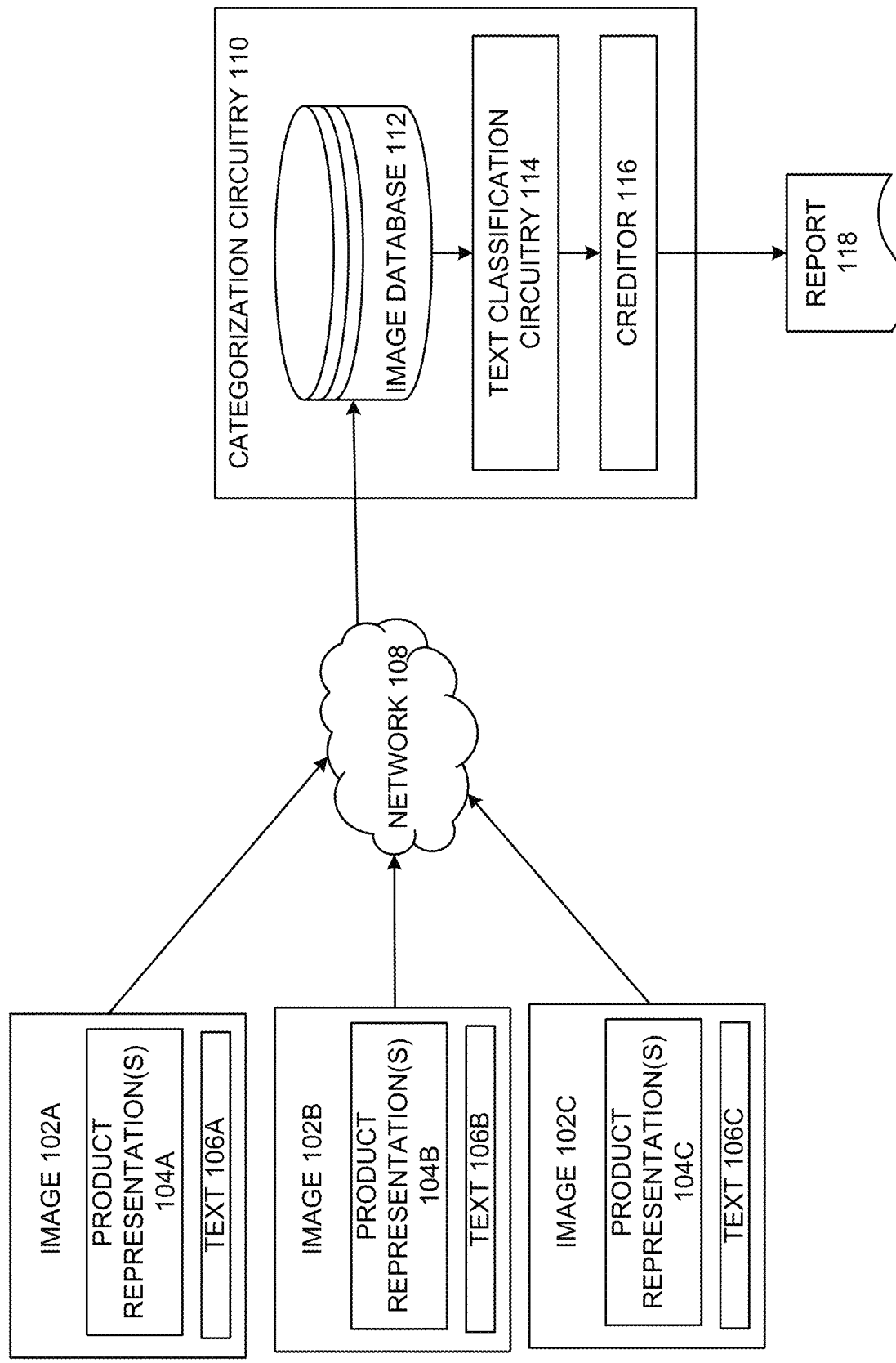
FIG. 1 is a schematic illustration of an example system for banner categorization to categorize image text in a manner consistent with this disclosure.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

A banner image is a portion of an image that contains product representations (e.g., an image portion) and associated textual descriptions. A banner, as distinguished from a banner image, is a collection of two or more banner images on a page/image. For example, a banner may be an advertisement column in, for example a store newspaper, which the banner image contains several banner images (e.g., portions of the page/image having advertisements for different products) in similar or various categories, along with their associated textual descriptions (e.g., a product name, a package size, etc.). In some examples, a banner may contain hundreds of product banner images (e.g., a buy one get one free offer, a sale promotion, etc.) for varying products.

With this, it may be advantageous to classify the banner images in a banner using a coding technique. As used herein, coding or otherwise a coding technique refers to a method of analyzing an input image (e.g., a banner image) to determine and/or otherwise annotate categories of each element in the banner (e.g., input image). For example, a coding technique may be implemented on a banner to determine the categories of each advertisement of the corresponding banner images. Further in such an example, a coding technique may produce results identifying which advertisements are skin-care advertisements, which advertisements are home improvement advertisements, which advertisements are car part advertisements, etc. With this, various entities may be able to gain insight into product organization, product placement, advertisement type, product category, etc.

To improve coding techniques, examples disclosed herein employ Artificial Intelligence (AI) to efficiently perform a task otherwise not feasible with the human mind. Examples disclosed herein utilize Computer Vision (CV) and Natural Language Processing (NLP) techniques to efficiently perform a coding technique on an input image. In particular, the vast number of products, product types, product differences between retailers, and the quantity of a given product in a given store introduce challenges for analyzing and coding such images as such requiring a high degree of temporal sequencing. Examples disclosed herein improve automation at which banner categorization is performed to reduce human error in analysis and image annotating increase the quality of image coding, and reduce time associated with image coding and categorization.

Examples disclosed herein utilize a neural network such as, for example, a region-based convolutional neural network (R-CNN) to detect the regions where the text of descriptions is located. For example, an R-CNN may be employed to determine regions of text likely to be a description of an associated product in a banner image. In response, examples disclosed herein utilize Optical Character Recognition (OCR) to examine a banner image pixel by pixel, looking for shapes that match the character traits. As such, examples disclosed herein apply an OCR-based algorithm over the regions previously detected using an R-CNN to obtain the text of interest related to the descriptions of the products in a banner image. In other examples, a Faster R-CNN, or a Region Proposal Network (RPN) may be utilized in place of an R-CNN. The examples, disclosed herein employ R-CNN neural networks to train models adapted to handle polysemy, and nuance enhancements.

In response to identifying, determining, and/or otherwise obtaining the text recognized from the interest regions, examples disclosed herein classify the text to determine the category of text to perform image (e.g., banner) categorization. In some examples, classification of the recognized and obtained text identifies one or more product categories (e.g., an ingredient of a product, a product type, a nutritional fact, a product size, a package size, an address, etc.).

FIG. 1 is a schematic illustration of an example system for banner categorization. As shown in FIG. 1, the system 100 may include a first image 102A, a second image 102B, and/or and third image 102C for categorization. In some examples, the images 102A, 102B, and/or 102C are banner images, whereas in other examples the images 102A, 102B, and/or 102C are a different type of image. In some examples, each image 102A-102C includes one or more product representations (e.g., an image, a graphic depicting the product, etc.), respectively. For example, image 102A includes product representation(s) 104A, image 102B includes product representation(s) 104B, and image 102C includes product representation(s) 104C, respectively. In some examples, each image 102A-102C includes one or more portions of text (e.g., a product description, a product ingredient listing, a promotional sale, a package size, etc.), respectively. For example, image 102A includes text 106A, image 102B includes text 106B, and image 102C includes text 106C, respectively. In some examples, each image is uploaded directly to an example network 108 for processing.

As shown by the system 100, an example categorization circuitry 110 may be used to perform the categorization of the images 102A-102C including respective portions of text 106A-106C. In some examples, the categorization circuitry 110 includes an example image database 112, an example text classification circuitry 114, and an example creditor 116. The image database 112, for example, may store some or a set of images 102A-102C uploaded to the network 108. For example, if at a particular time only images uploaded on a particular time or date are to be coded and analyzed, the image database 112 may store those images. In some examples, the text classification circuitry 114, can analyze the images stored in the image database 114 and perform categorization. The results of the text categorization for the one or more images may then be sent to the creditor 116. In some examples, the creditor 116 generates an example report 118 to report the text categorizations of the images analyzed by the text classification circuitry 114 of the categorization circuitry 110.

Figure 2:
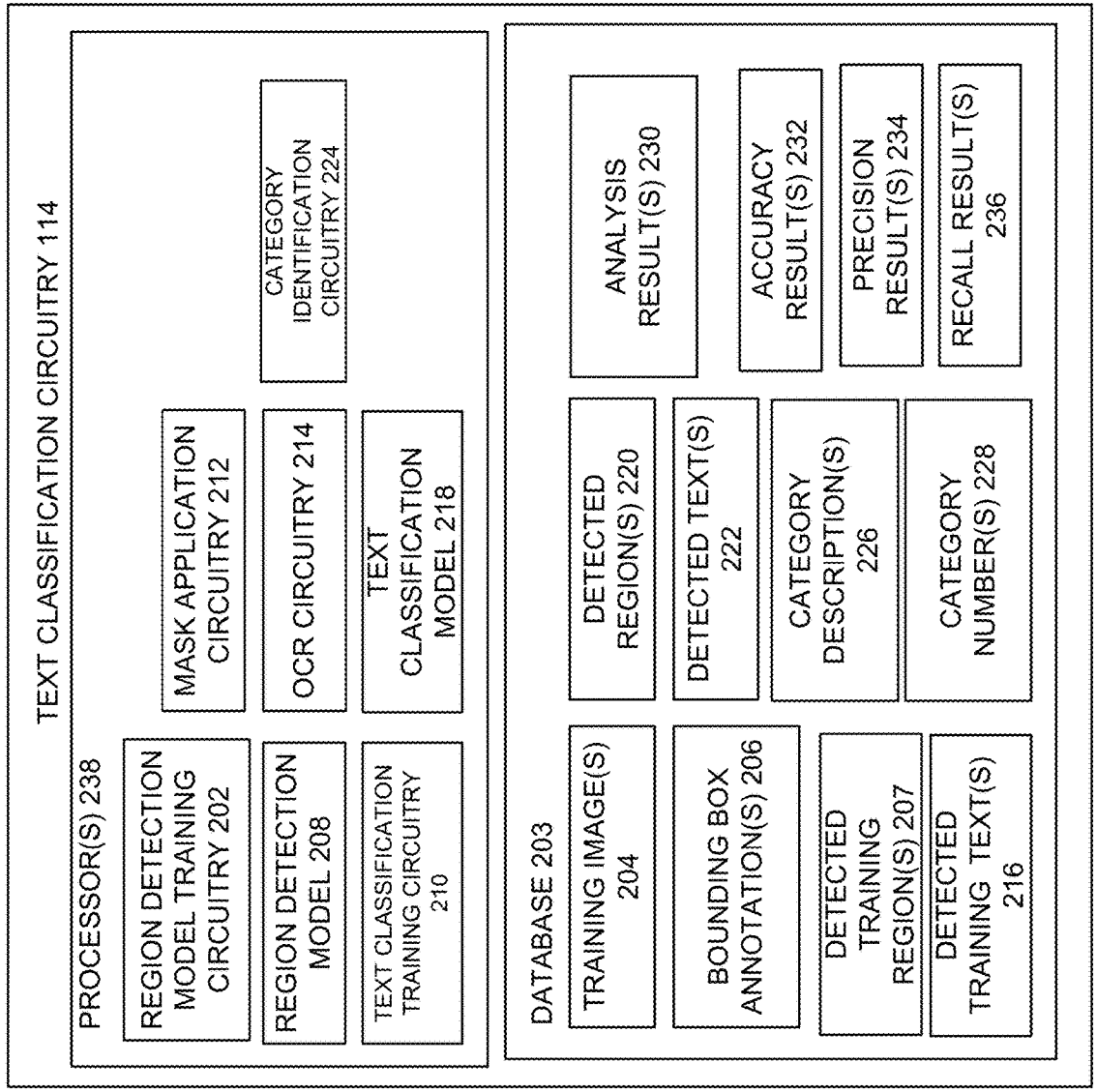
FIG. 2 is a schematic illustration of text classification circuitry of FIG. 1.

FIG. 2 illustrated the example text classification circuitry 114 as shown in FIG. 1. In some examples, the text classification circuitry 114 includes an example region detection model training circuitry 202 for detecting one or more regions of an image 102A-102C related to text or textual descriptions of each product. R-CNN model architectures utilize Ground-Truth (GT) information that is known to be real or true. For example, in the examples disclosed herein, GT information is employed about generated bounding boxes and associated classes of information to teach one or more neural networks to localize and classify objects of interest. In particular, once bounding boxes are localized in a particular image, the R-CNN classifies the bounding boxes based on the GT information provided. As such, the region detection model training circuitry 202 utilizes a set of one or more GT training images 204 stored in an example database 203 of the text classification circuitry 114. The training image(s) 204 may include images of example image banners including one or more product representations (shown in FIG. 1) and or text (shown in FIG. 1) associated with the product representation. In some examples, the region detection model training circuitry 202 utilizes a set of one or more bounding box annotation(s) 206 to further train the R-CNN to recognize text within generated bounding boxes circumscribing portions containing text within an image.

In some examples, the text classification circuitry 114 includes one or more databases 203. The example database 203 may be implemented as any type of storage device and include training images 204, bounding box annotations 206, detected training region(s) 207, detected training text 216, detected regions 220, detected text 222, category descriptions 226, category numbers 228, analysis results 230, accuracy results 232, precision results 234 and/or recall results 236. The aforementioned example database 203 elements may be data structures with numeric, alphabetic and/or alphanumeric information contained therein.

Figure 3:
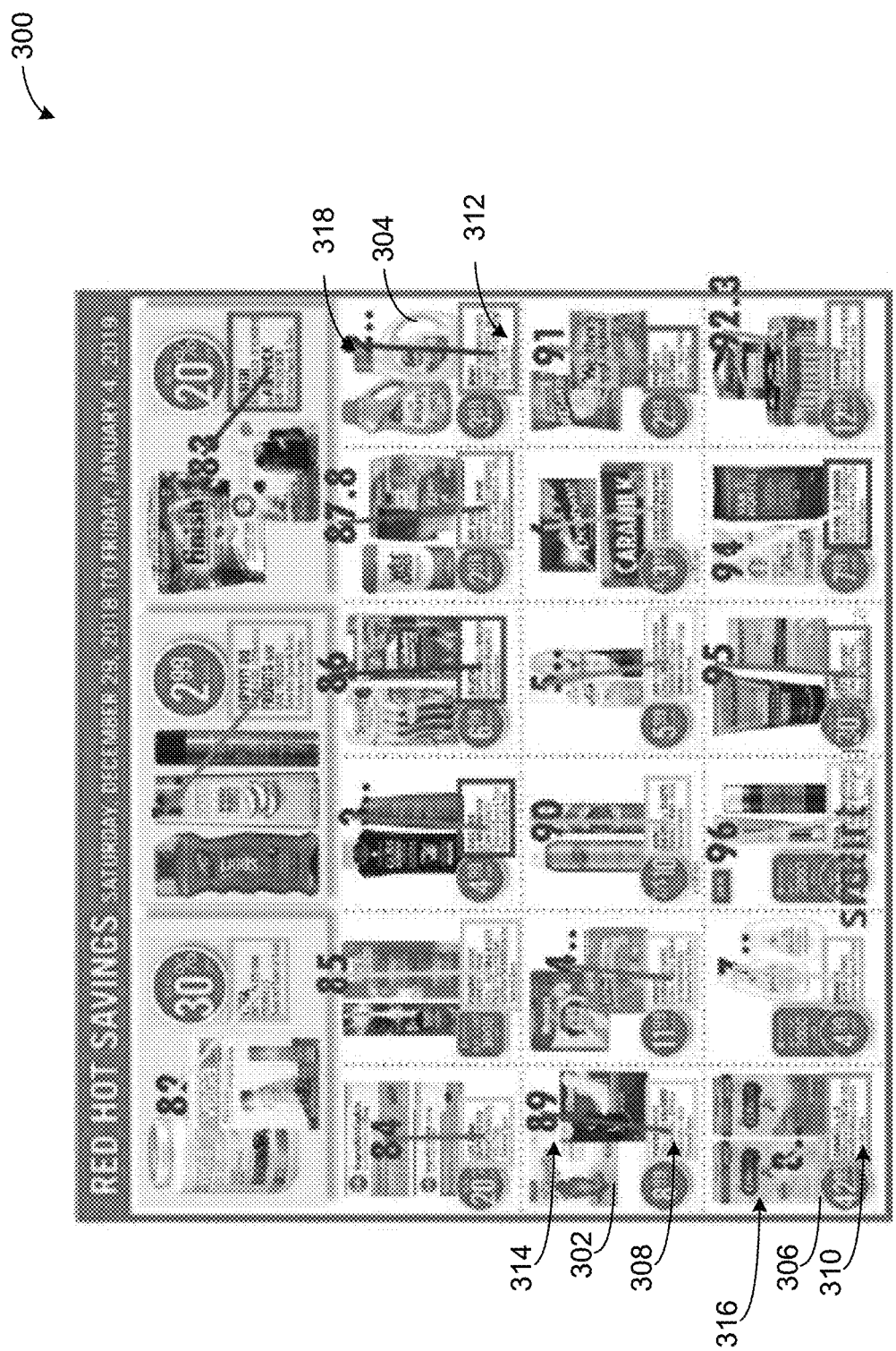
FIG. 3 is an example training image including an example banner and corresponding banner images.

FIG. 3 is an example training image 300 including example banner images 302, 304, and 306 for use with the region detection model training circuitry 202 of FIG. 2. While three (3) example banner images are singled-out or otherwise specified in FIG. 3, several more banner images are located in the example training image 300 and not discussed further. As shown by FIG. 3, the banner images 302, 304, and 306 include identified GT bounding boxes 308, 310, and 312, around text for training purposes. Once the training image(s) 204 are labelled with the appropriate bounding boxes, the R-CNN model is trained by inputting the training images 204 jointly with the bounding box annotation(s) 206. As such, in some examples, the region detection model training circuitry 202 utilizes the training image(s) 204 and the bounding box annotation(s) 206 to generate a trained region detection model 208. In some examples, one or more models (e.g., the example region detection model 208) may be stored in the example database 203 as a data structure. In some examples, a Region Proposal Network (RPN) is applied to propose multiple objects identifiable within a particular image.

In some examples, the text classification circuitry 114 includes a text classification training circuitry 210 to train a second R-CNN neural network to recognize text in the region detected containing textual descriptions. In some examples, the text classification training circuitry 210 utilizes the training image(s) 204, the bounding box annotation(s) 206, and an example set of training categories (e.g., a data structure of stored training categories) to generate a model for classifying text recognized by the example region detection model 208. In some examples, the text classification training circuitry 210 applies a technique based on optical character recognition (OCR) to recognize the text associated with the previously detected product descriptions. The OCR technique converts the images 102A-102C (shown in FIG. 1) into machine readable text data. Typically, the human visual system reads and interprets text by recognizing the patterns of contrast between light and dark, translating those patterns into characters and words, and then attaching meaning to the characters and words recognized. Similarly, OCR attempts to mimic this visual technique by using neural networks. As such, the neural network architecture applied by the text classification training circuitry 210 applies OCR techniques to return characters and words obtained from images and respective locations. In some examples, example mask application circuitry 212 applies a mask to increase contrast (e.g., blacken) areas of an image that are not contained in any bounding boxes detected by the region detection model 208. In some examples, the darkened regions do not interfere with the regions of interest related to product descriptions during application of one or more OCR techniques/processes. Accordingly, example disclosed herein improve computational efficiency and accuracy by application of masks prior to application of OCR techniques. In some examples, example OCR circuitry 214 recognizes the text in each of the bounding boxes of the training image(s) 204. In some examples, the text classification training circuitry 210 processes the text to reduce blurring, and/or errors associated with unrecognized symbols, errors derived from lower/upper case letters or dictionary-based corrections. After recognizing the text corresponding to product descriptions in images, the example text classification training circuitry 210 applies a text classification algorithm to predict the different product categories of interest. In some examples, each product is associated to more than one category. The illustrated example of FIG. 2 also includes a text classification model 218 and category identification circuitry 224.

Returning back to FIG. 3, the example banner images 302, 304, and 306 (e.g., within corresponding regions of a rectangular shape in the image 300 having individual product information therein) further include number identifiers 314, 316 and 318 added by a business coding team, for example, to denote a category associated with a description in the training image(s) 204 for model training purposes. Additionally, the illustrated example of FIG. 3 includes banner text 308, 310 and 312. Banner text is distinguished from text that might be present on images of the various products within each region.

In operation, the example region detection model training circuitry 202 applies one or more trained region detection models to an input image, such as the example banner image 300 of FIG. 3. Generally speaking, examples disclosed herein detect regions related to textual descriptions of each product in a banner image, then recognize associated banner text as distinguished from any other text that might reside on the product images themselves, and further classifies the recognized text into different product categories, as described in further detail below. Because a banner includes at least two or more regions in which each region contains a banner image and corresponding banner text, the example region detection model training circuitry 202 detects such candidate regions in the banner. Typically, candidate regions have an orthogonal shape that is square or rectangular, but other shapes may be realized by examples disclosed herein.

The example region detection model training circuitry 202 employs an R-CNN schema to differentiate and/or otherwise distinguish banner text from text that may reside on product images within the candidate regions. In particular, the R-CNN schema differentiates the particular appearance of text found on product images versus text found within the candidate region so that banner text (e.g., text written by an advertiser of the banner) is differentiated from the rest of the text in the region of interest.

In some examples, the region detection model training circuitry 202 generates bounding boxes around detected candidate regions and/or around banner text. Briefly returning to the illustrated example of FIG. 3, the region detection model training circuitry 202 generates the bounding boxes 308, 310 and/or 312 to distinguish and/or otherwise identify banner text as distinguished from the text that may reside on the adjacent products within each banner image. In some examples, the region detection model training circuitry 202 employs R-CNN architectures with ground truth information corresponding to bounding boxes and associated classes so that the network is trained to localize and classify one or more objects of interest. When performing banner categorization, some examples include labeling of the bounding boxes, as shown in FIG. 3. In particular, example labelling in FIG. 3 is shown as bolded numbers (e.g., "82," "84," "96," etc.). Such numbers correspond to coding efforts that may be unique to particular advertisers and/or entities chartered with the responsibility of categorizing banners. Such codes/labels permit knowledge of categories associated with particular descriptions, which is particularly helpful as training set data.

Upon completion of labeling of the training set, the R-CNN model is trained by inputting images with ground truth in connection with hyperparameters. Once trained, the model is applied to perform predictions of bounding boxes over unknown banner images.

As described above, performing OCR facilitates text recognition, which is particularly helpful when attempting to identify and/or otherwise detect products and corresponding product descriptions printed on a banner. While attempts to perform OCR on detected and/or otherwise predicted bounding boxes will eventually yield meaning of text, the OCR techniques can become hindered by other text near such bounding boxes and/or other text that might be printed on the products themselves. Such artifacts cause error and performance/speed degradation in the OCR process. Examples disclosed herein reduce such errors and improve OCR performance.

Figure 7A:
FIGS. 7A, 7B and 7C are example banners.
Figure 7B:
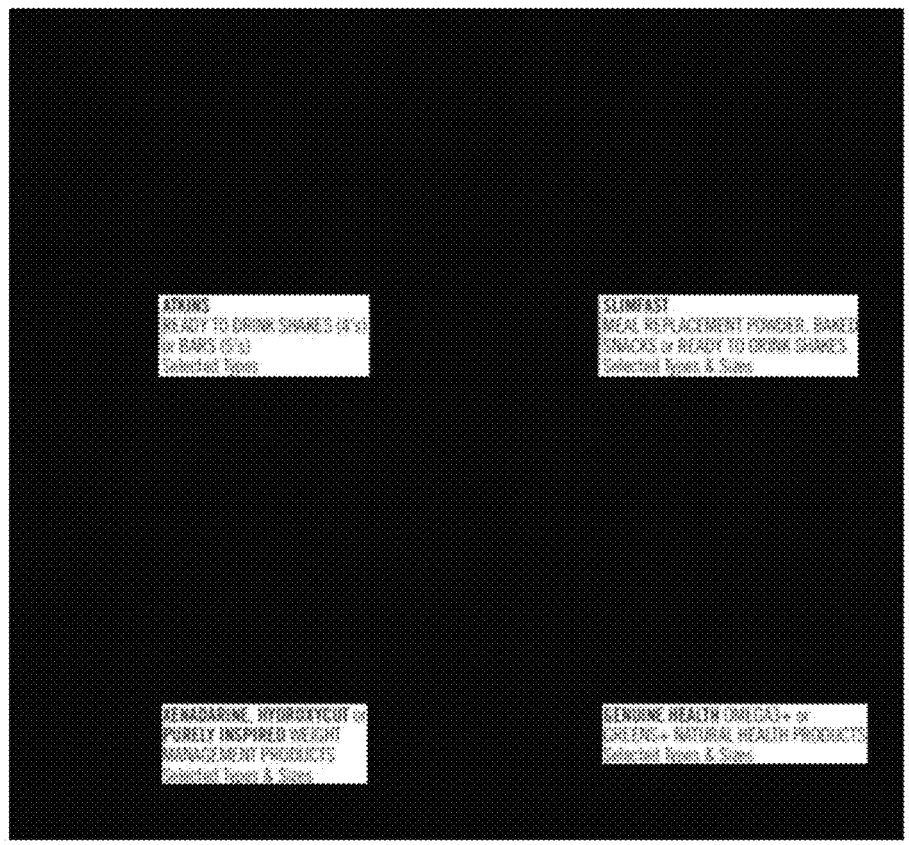
Figure 7C:

The example mask application circuitry 212 applies a mask to the candidate bounding boxes and/or candidate regions of the banner. Turning briefly to FIG. 7A, an example banner is shown with four (4) separate banner images (regions). In some examples, the illustrated example of FIG. 7C is generated by examples disclosed herein to generate bounding boxes on the example banner. The example mask application circuitry 212 applies the example mask in such a manner as to occlude, block, mask and/or otherwise obscure all portions of the banner except those corresponding to the predicted bounding boxes, as shown in FIG. 7B.

With the text available on the banner with reduced and/or otherwise eliminated interference from other text unassociated with the banner text, the example OCR circuitry 214 performs OCR on the banner in a manner with improved speed, reduced computational demand and reduced error. In some examples, the OCR circuitry 214 post-processes the text to reduce typical well-known errors in NLP techniques, such as those errors associated with symbols incorrectly detected, errors derived from lower/upper case letters, dictionary-based corrections, etc.

The example OCR circuitry 214 obtains text corresponding to the contents of the banner text bounding boxes and the example text classification circuitry 114 applies one or more trained text classification models in an effort to classify the text into one or more categories. In particular, the example category identification circuitry 224 classifies the text into one or more categories. Each product is associated with at least one category, but in some examples a product is associated with two or more categories, as needed. The example text classification model employed and/or otherwise invoked by the category identification circuitry 224 is a machine learning approach that employs a neural network having at least one layer. In some examples, the neural network structure/architecture generates a bag-of-words representation of the text, where embeddings are fetched for each word. In some examples, the embeddings are averaged to obtain a single embedding for the whole text in a hidden layer of the architecture. Once the averaged embeddings are computed, the single vector is fed to a linear classifier that applies softmax. In some examples, character n-grams are applied, which are helpful for classification that typically contains one or several descriptive words and/or typographical errors corresponding to the OCR technique(s).

For training such a text classification architecture, examples disclosed herein construct at least one dataset with manually labeled data corresponding to categories of interest associated with each text description. The trained model is used to perform inference of the categories related to each product description, and the inference output gives a vector with probabilities for each available category of interest. In some examples, a threshold is set corresponding to evaluation results and used to filter the categories corresponding to each detected instance.

Figure 4:
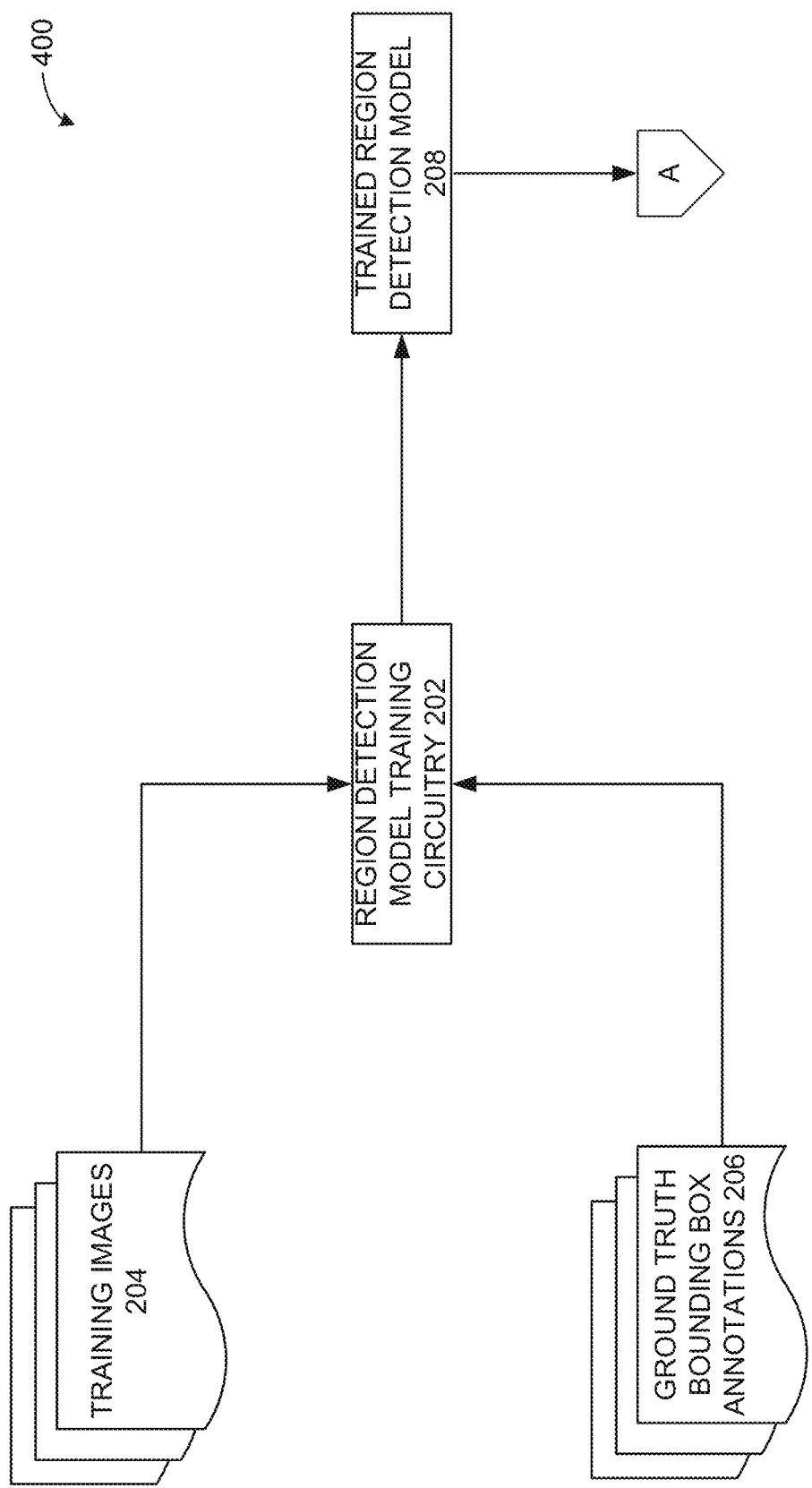
FIGS. 4, 5 and 6 are schematic illustrations of example framework to categorize image text.
Figure 5:
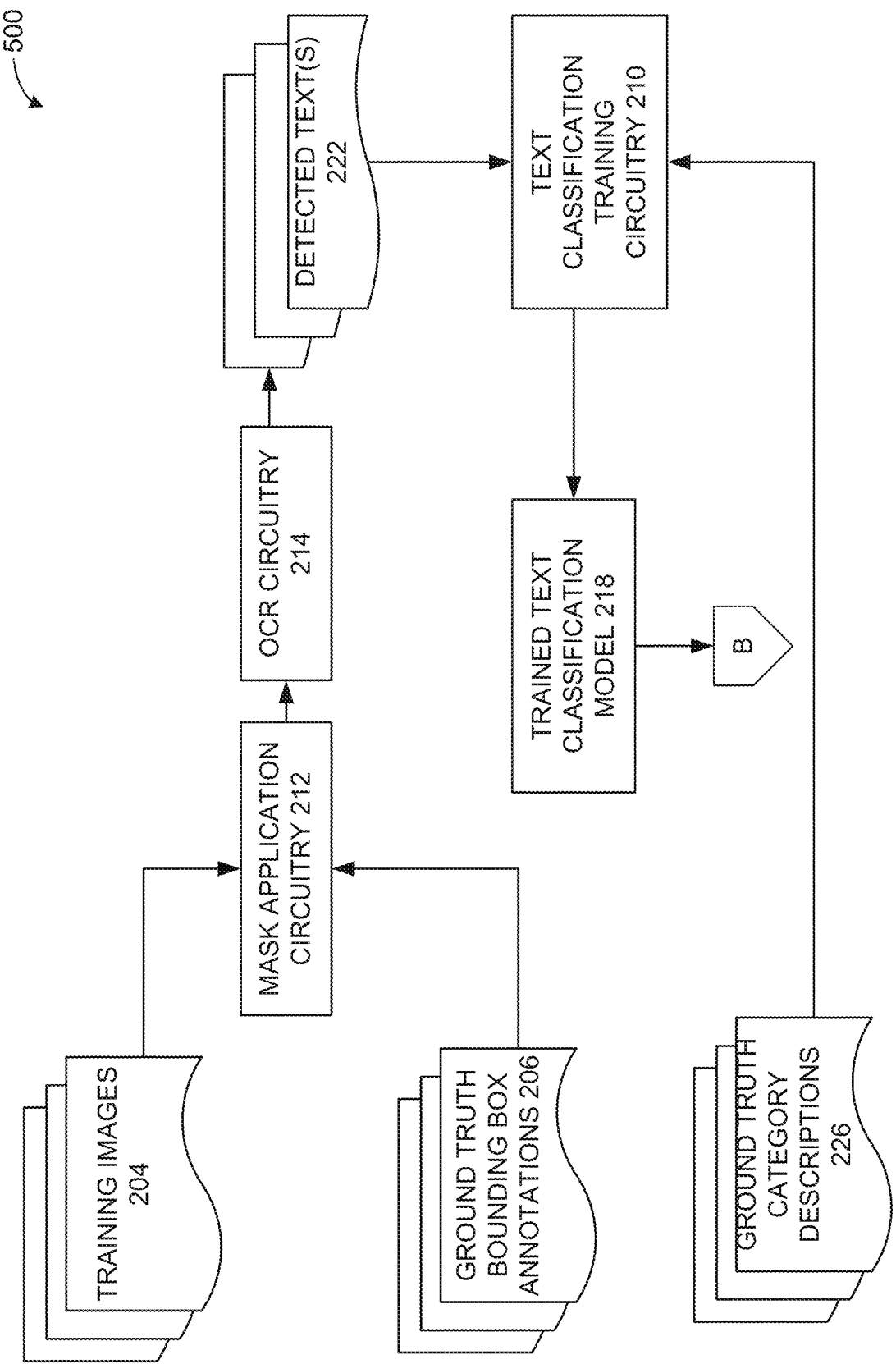
Figure 6:
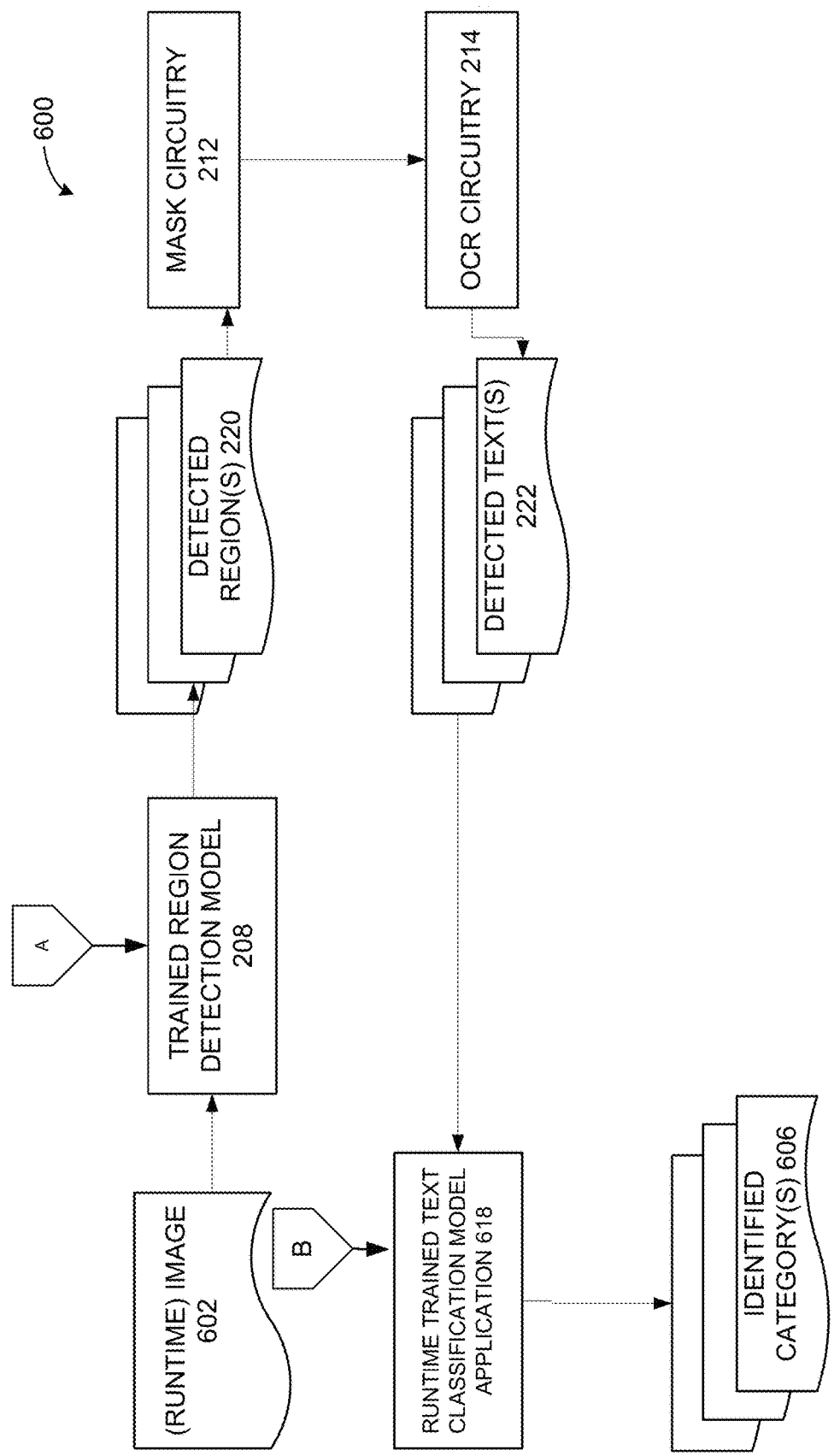

FIGS. 4, 5 and 6 are schematic diagrams of an example framework to categorize text from banners. In particular, the example framework is implemented by the illustrated examples of FIGS. 1 and 2, in which FIG. 4 is a framework 400 corresponding to training models for region detection, FIG. 5 is a framework 500 corresponds to training models for text classification, and FIG. 6 is a framework 600 corresponds to banner categorization inference. In the illustrated example of FIG. 4, the framework 400 takes as inputs training images 204 and ground truth bounding box annotations 206, which are provided to the example region detection model training circuitry 202. Iterations of this framework 400 generate any number of trained region detection model(s) 208, which are provided to the example runtime framework 600 of FIG. 6, discussed in further detail below.

In the illustrated example of FIG. 5, the framework 500 takes as input training images 204, ground truth bounding box annotations 206 and ground truth category descriptions 226. As described above, the example framework 500 of FIG. 5 addresses traditional bottleneck issues corresponding to performing OCR techniques by invoking the example mask application circuitry 212 prior to invoking the example OCR circuitry 214 to generate detected text(s) 222. Additionally, the example framework 500 invokes the example text classification training circuitry 210 to take as further input the ground truth category descriptions 226 and generate the example trained text classification model 218, which is applied during runtime.

In the illustrated example of FIG. 6, the framework 600 takes as input new (runtime) image data 602 and applies the previously generated trained region detection model 208 from FIG. 4 (e.g., a first model). New detected regions 220 are identified and the example mask circuitry 212 is applied in advance of the example OCR circuitry 214 to generate detected texts 222. A second model 618 (e.g., the text classification model 218 from FIG. 5) is then invoked to generate identified categories 606.

In some examples, the region detection model training circuitry 202 includes means for region detection model training, the example text classification training circuitry 210 includes means for text classification training, the example mask application circuitry 212 includes means for masking, the example OCR circuitry 214 includes means for OCRing, and the example category identification circuitry 224 includes means for category identifying. For example, the means for region detection model training may be implemented by the example region detection model training circuitry 202, the means for text classification training may be implemented by the example text classification training circuitry 210, the means for masking may be implemented by the example mask application circuitry 212, the means for OCRing may be implemented by the example OCR circuitry 214, and the means for category identifying may be implemented by the example category identification circuitry 224. In some examples, the aforementioned circuitry may be implemented by machine executable instructions such as that implemented by at least blocks of FIGS. 8 and/or 9 executed by processor circuitry, which may be implemented by the example processor circuitry 1012 of FIG. 10, the example processor circuitry 1100 of FIG. 11, and/or the example Field Programmable Gate Array (FPGA) circuitry 1200 of FIG. 12. In other examples, the aforementioned circuitry is implemented by other hardware logic circuitry, hardware implemented state machines, and/or any other combination of hardware, software, and/or firmware. For example, the aforementioned circuitry may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the text classification circuitry 114 of FIG. 1 is illustrated in FIGS. 2, 4, 5 and 6, one or more of the elements, processes, and/or devices illustrated in FIGS. 1, 2, 4, 5 and 6 may be combined, divided, re-arranged, omitted, eliminated, and/or implemented in any other way. Further, the example region detection model training circuitry 202, the example text classification training circuitry 210, the example mask application circuitry 212, the example OCR circuitry 214, the example category identification circuitry 224, and/or, more generally, the example text classification circuitry 114 of FIGS. 1 and 2 may be implemented by hardware, software, firmware, and/or any combination of hardware, software, and/or firmware. Thus, for example, any of the example region detection model training circuitry 202, the example text classification training circuitry 210, the example mask application circuitry 212, the example OCR circuitry 214, the example category identification circuitry 224, and/or, more generally, the example text classification circuitry 114 of FIGS. 1 and 2, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example region detection model training circuitry 202, the example text classification training circuitry 210, the example mask application circuitry 212, the example OCR circuitry 214, the example category identification circuitry 224, and/or, more generally, the example text classification circuitry 114 of FIGS. 1 and 2 is/are hereby expressly defined to include a non-transitory computer readable storage device or storage disk such as a memory, a digital versatile disk (DVD), a compact disk (CD), a Blu-ray disk, etc., including the software and/or firmware. Further still, the example text classification circuitry 114 of FIGS. 1 and/or 2 may include one or more elements, processes, and/or devices in addition to, or instead of, those illustrated in FIGS. 1 and/or 2, and/or may include more than one of any or all of the illustrated elements, processes and devices.

Figure 8:
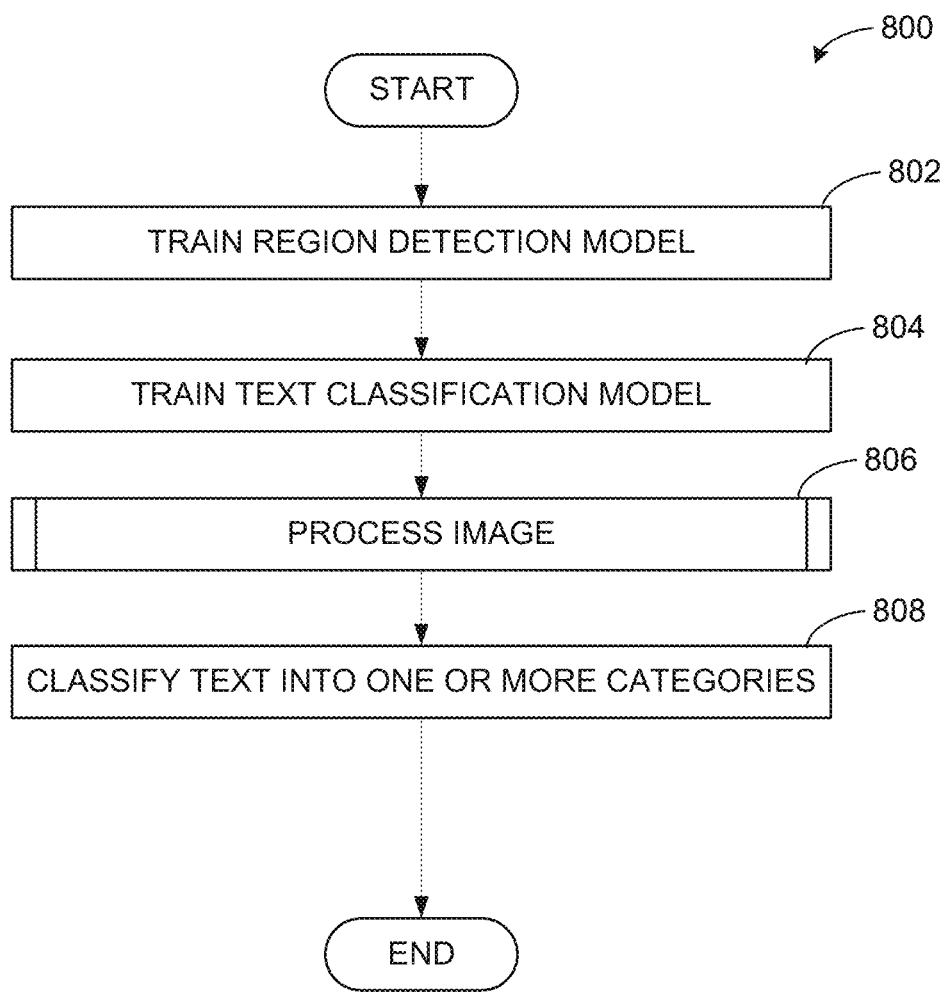
FIGS. 8 and 9 are flowcharts representative of example machine readable instructions that may be executed by example processor circuitry to implement the example system of FIG. 1, the example text classification circuitry of FIGS. 1 and 2, and/or the example framework of FIGS. 4, 5 and 6.
Figure 9:
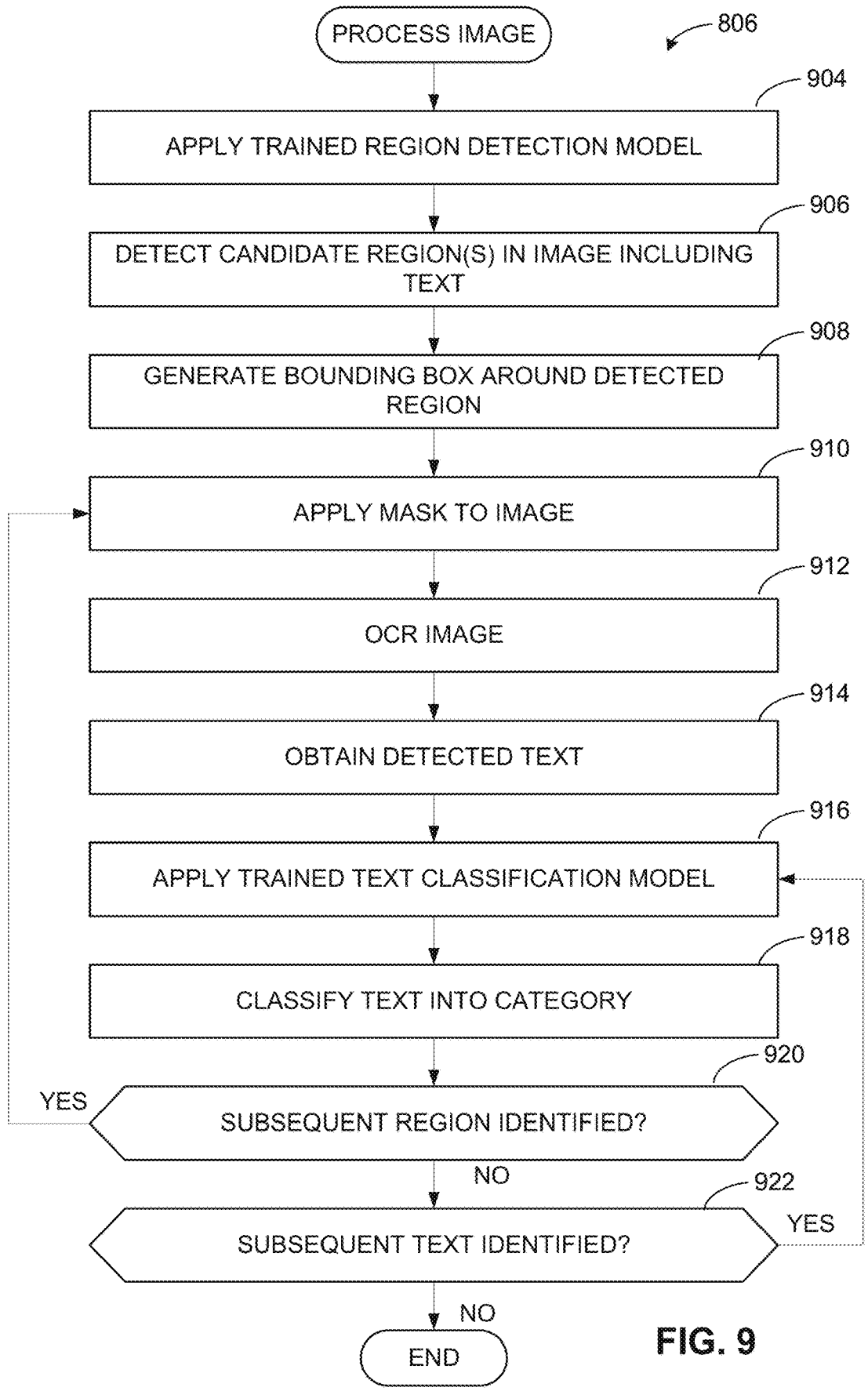

Flowcharts representative of example hardware logic circuitry, machine readable instructions, hardware implemented state machines, and/or any combination thereof for implementing the text classification circuitry 114 of FIGS. 1 and 2 are shown in FIGS. 8 and 9. The machine readable instructions may be one or more executable programs or portion(s) of an executable program for execution by processor circuitry, such as the processor circuitry 1012 shown in the example processor platform 1000 discussed below in connection with FIG. 10 and/or the example processor circuitry discussed below in connection with FIGS. 11 and/or 12. The program(s) may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program(s) is/are described with reference to the flowcharts illustrated in FIGS. 8 and 9, many other methods of implementing the example text classification circuitry 114 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 8 and 9 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

In the illustrated example of FIG. 8, the example text classification circuitry 114 invokes the example region detection model training circuitry 202 to generate and/or otherwise train the region detection model(s) (block 802). The example text classification circuitry 114 invokes the example text classification training circuitry 210 to generate and/or otherwise train the text classification model(s) (block 804). As described above, model training includes training images and ground truth data. The example text classification circuitry 114 then proceeds to process images during a runtime stage (block 806), and the example category identification circuitry 224 classifies text into one or more categories (block 808).

FIG. 9 illustrates additional detail corresponding to processing the image (block 806) of FIG. 8. In the illustrated example of FIG. 9, the example region detection model training circuitry 202 applies a trained region detection model (block 904) and proceeds to detect candidate region(s) in the input image that include text (block 906). The example region detection model training circuitry 202 generates bounding boxes around detected regions (block 908), and the example mask application circuitry 212 applies a mask to the candidate region of the image (block 910). The example OCR circuitry 214 applies OCR techniques to the masked image (block 912) and obtains detected text (block 914). The example text classification circuitry 114 applies the trained text classification model (block 916) for the purpose of classifying text into one or more categories (block 918). In the event the example region detection model training circuitry 202 determines that there are additional/subsequent regions to process (block 920), control returns to block 910, otherwise the example text classification circuitry 114 determines whether there is additional/subsequent text to be processed (block 922). If so, control returns to block 916, otherwise the example process ends.

Figure 10:
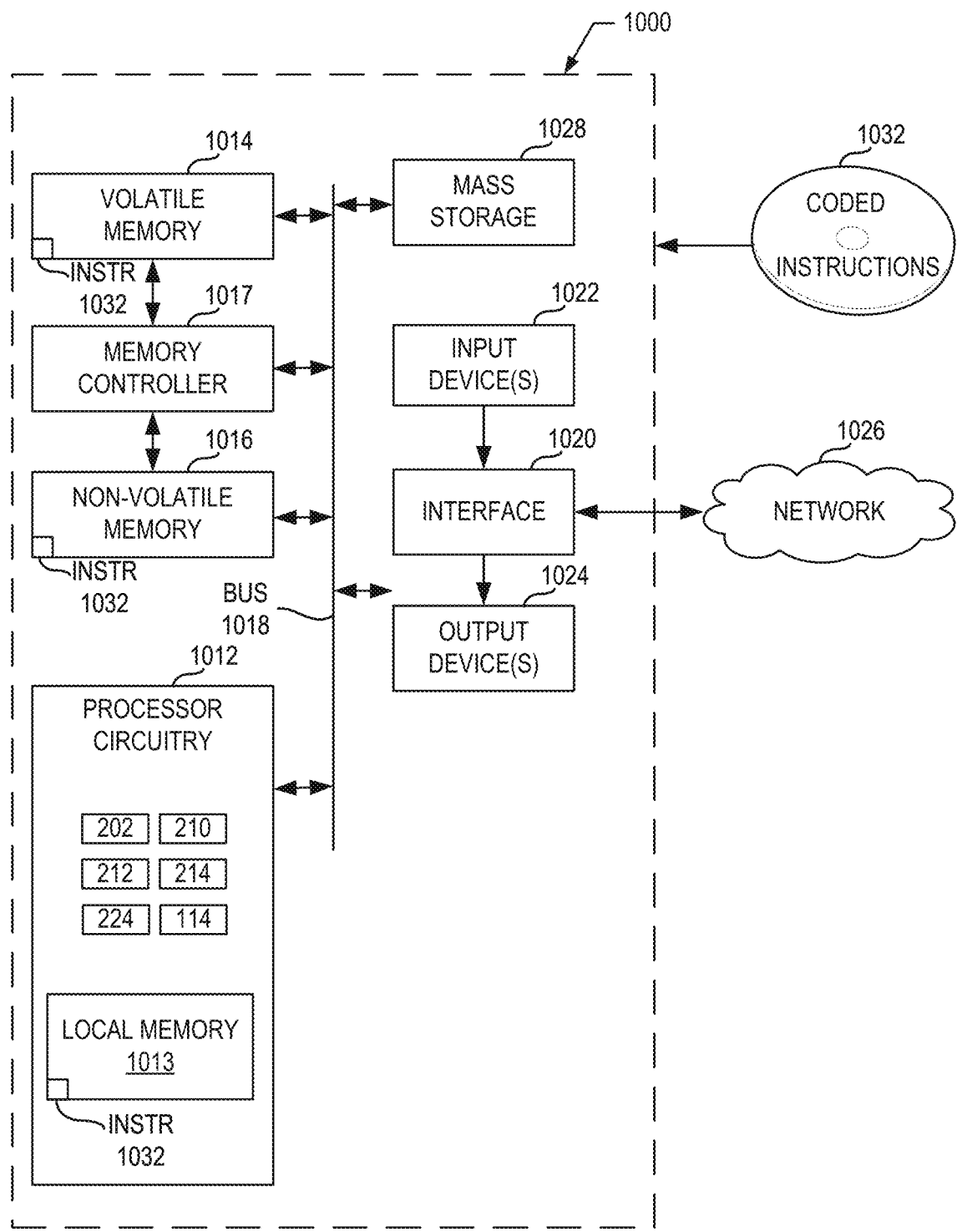
FIG. 10 is a block diagram of an example processing platform including processor circuitry structured to execute the example machine readable instructions of FIGS. 8 and 9 to implement the example system of FIG. 1, the example text classification circuitry of FIGS. 1 and 2, and/or the example framework of FIGS. 4, 5 and 6.

FIG. 10 is a block diagram of an example processor platform 1000 structured to execute and/or instantiate the machine readable instructions and/or operations of FIGS. 8 and/or 9 to implement the text classification circuitry 114 of FIGS. 1 and/or 2. The processor platform 1000 can be, for example, a server, a personal computer, a workstation, a self-learning machine (e.g., a neural network), a mobile device (e.g., a cell phone, a smart phone, a tablet such as an iPad™), an Internet appliance, a gaming console, a personal video recorder, a set top box, a headset (e.g., an augmented reality (AR) headset, a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 412 implements the example region detection model training circuitry 202, the example text classification training circuitry 210, the example mask application circuitry 212, the example OCR circuitry 214, the example category identification circuitry 224, and/or, more generally, the example text classification circuitry 114 of FIGS. 1 and 2.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1022 are connected to the interface circuitry 1020. The input device(s) 1022 permit(s) a user to enter data and/or commands into the processor circuitry 1012. The input device(s) 422 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The output devices 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1032, which may be implemented by the machine readable instructions of FIGS. 8 and/or 9, may be stored in the mass storage device 1028, in the volatile memory 1014, in the non-volatile memory 1016, and/or on a removable non-transitory computer readable storage medium such as a CD or DVD.

Figure 11:
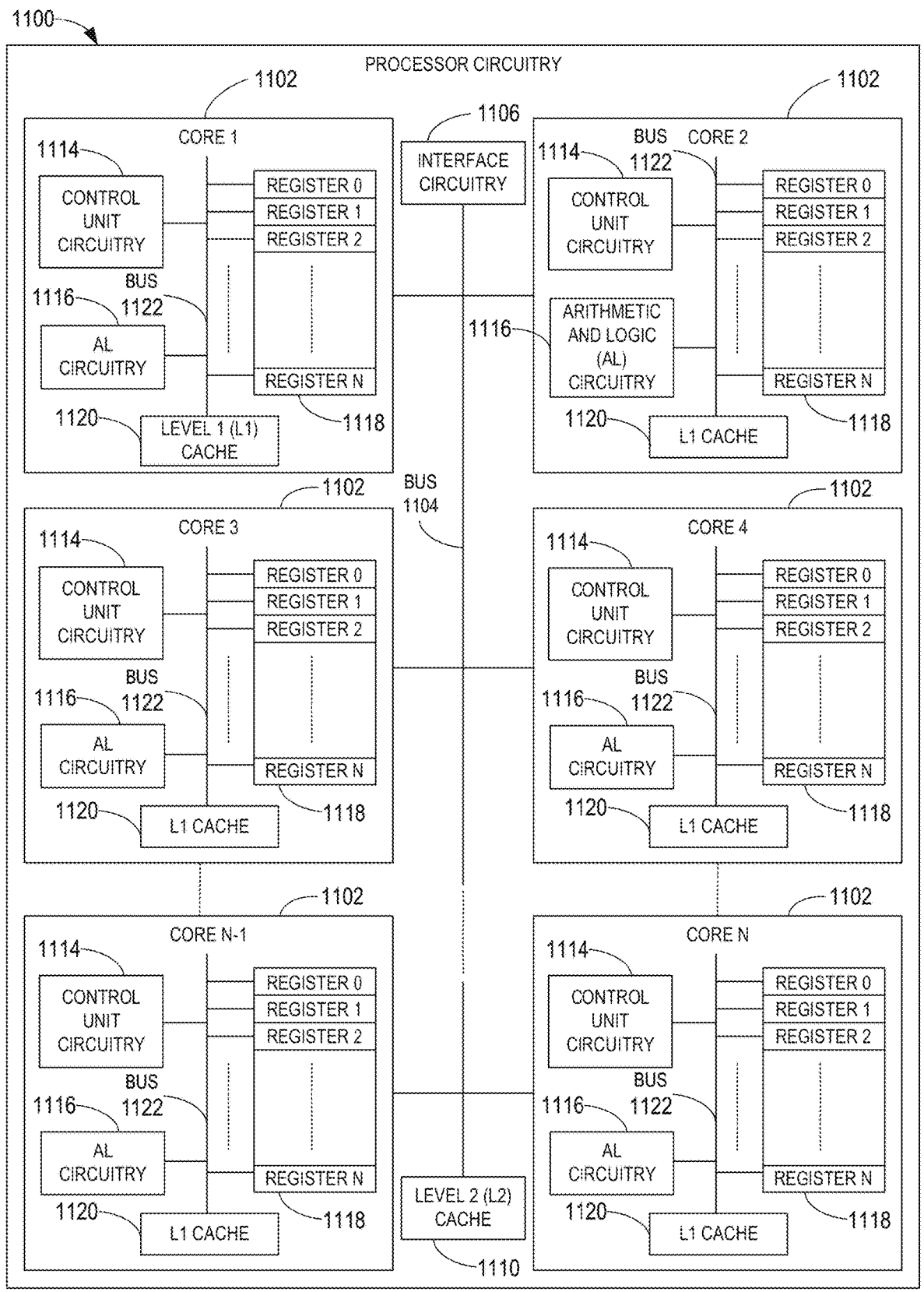
FIG. 11 is a block diagram of an example implementation of the processor circuitry of FIG. 10.

FIG. 11 is a block diagram of an example implementation of the processor circuitry 1012 of FIG. 10. In this example, the processor circuitry 1012 of FIG. 10 is implemented by a microprocessor 1100. For example, the microprocessor 1100 may implement multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowcharts of FIGS. 8 and 9.

The cores 1102 may communicate by an example bus 1104. In some examples, the bus 1104 may implement a communication bus to effectuate communication associated with one(s) of the cores 1102. For example, the bus 1104 may implement at least one of an Inter-Integrated Circuit (I2C) bus, a Serial Peripheral Interface (SPI) bus, a PCI bus, or a PCIe bus. Additionally or alternatively, the bus 1104 may implement any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2_cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the L1 cache 1120, and an example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating point operations. In yet other examples, the AL circuitry 1116 may include first AL circuitry that performs integer based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure including distributed throughout the core 1102 to shorten access time. The bus 1120 may implement at least one of an I2C bus, a SPI bus, a PCI bus, or a PCIe bus Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMS s), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 12:
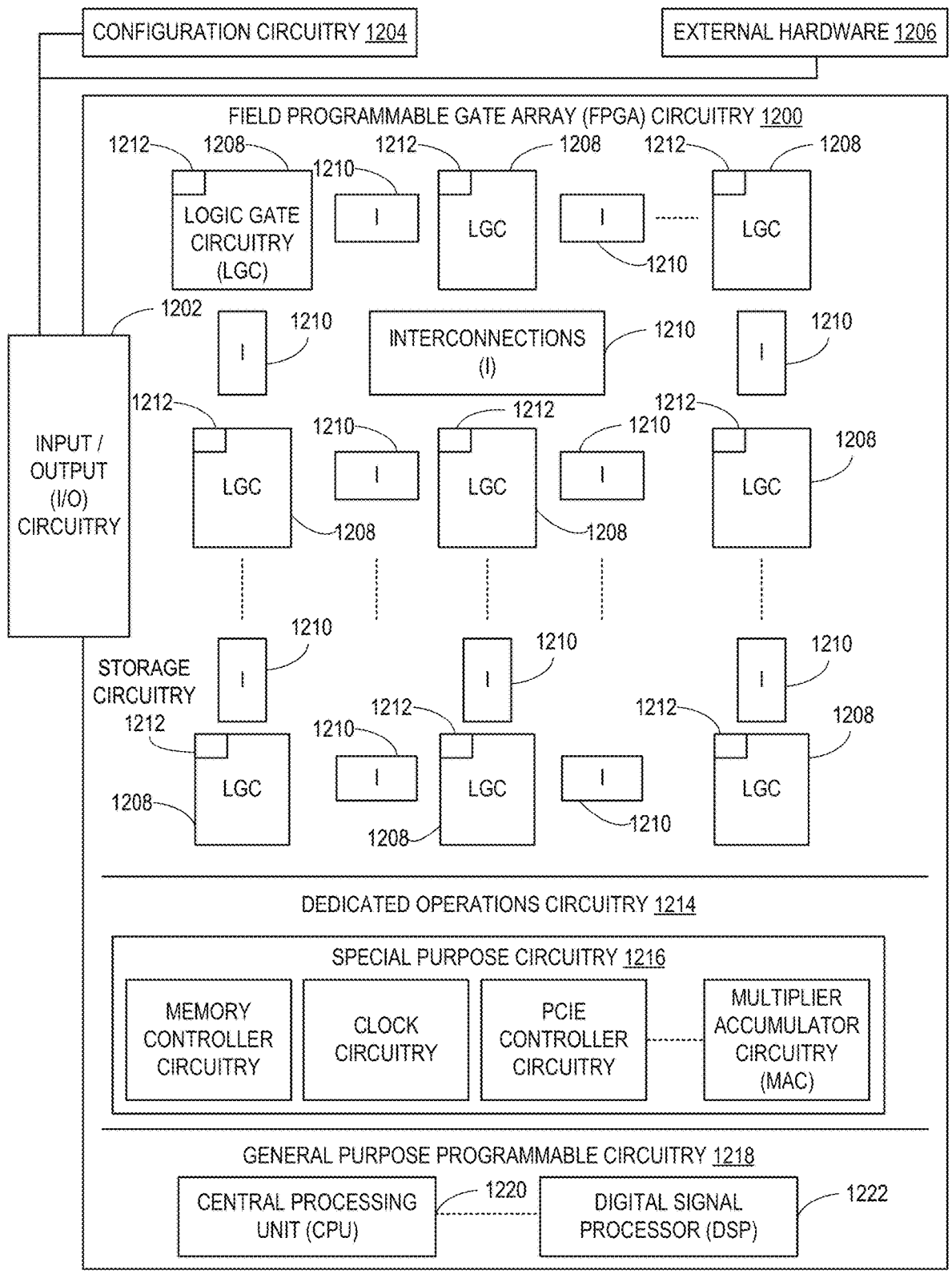
FIG. 12 is a block diagram of another example implementation of the processor circuitry of FIG. 10.

FIG. 12 is a block diagram of another example implementation of the processor circuitry 1012 of FIG. 10. In this example, the processor circuitry 1012 is implemented by FPGA circuitry 1200. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the machine readable instructions in hardware and, thus, can often execute the operations faster than they could be performed by a general purpose microprocessor executing the corresponding software.

More specifically, in contrast to the microprocessor 1100 of FIG. 11 described above (which is a general purpose device that may be programmed to execute some or all of the machine readable instructions represented by the flowcharts of FIGS. 8 and 9 but whose interconnections and logic circuitry are fixed once fabricated), the FPGA circuitry 1200 of the example of FIG. 12 includes interconnections and logic circuitry that may be configured and/or interconnected in different ways after fabrication to instantiate, for example, some or all of the machine readable instructions represented by the flowcharts of FIGS. 8 and 9. In particular, the FPGA 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowcharts of FIGS. 8 and 9. As such, the FPGA circuitry 1200 may be structured to effectively instantiate some or all of the machine readable instructions of the flowcharts of FIGS. 8 and 9 as dedicated logic circuits to perform the operations corresponding to those software instructions in a dedicated manner analogous to an ASIC. Therefore, the FPGA circuitry 1200 may perform the operations corresponding to the some or all of the machine readable instructions of FIGS. 8 and 9 faster than the general purpose microprocessor can execute the same.

In the example of FIG. 12, the FPGA circuitry 1200 is structured to be programmed (and/or reprogrammed one or more times) by an end user by a hardware description language (HDL) such as Verilog. The FPGA circuitry 1200 of FIG. 12, includes example input/output (I/O) circuitry 1202 to obtain and/or output data to/from example configuration circuitry 1204 and/or external hardware (e.g., external hardware circuitry) 1206. For example, the configuration circuitry 1204 may implement interface circuitry that may obtain machine readable instructions to configure the FPGA circuitry 1200, or portion(s) thereof. In some such examples, the configuration circuitry 1204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may implement the microprocessor 1100 of FIG. 11. The FPGA circuitry 1200 also includes an array of example logic gate circuitry 1208, a plurality of example configurable interconnections 1210, and example storage circuitry 1212. The logic gate circuitry 1208 and interconnections 1210 are configurable to instantiate one or more operations that may correspond to at least some of the machine readable instructions of FIGS. 8 and 9 and/or other desired operations. The logic gate circuitry 1208 shown in FIG. 12 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the processor circuitry 1012 of FIG. 10, many other approaches are contemplated. For example, as mentioned above, modern FPGA circuitry may include an on-board CPU, such as one or more of the example CPU 1220 of FIG. 12. Therefore, the processor circuitry 1012 of FIG. 10 may additionally be implemented by combining the example microprocessor 1100 of FIG. 11 and the example FPGA circuitry 1200 of FIG. 12. In some such hybrid examples, a first portion of the machine readable instructions represented by the flowcharts of FIGS. 8 and 9 may be executed by one or more of the cores 1102 of FIG. 11 and a second portion of the machine readable instructions represented by the flowcharts of FIGS. 8 and 9 may be executed by the FPGA circuitry 1200 of FIG. 12.

In some examples, the processor circuitry 1012 of FIG. 10 may be in one or more packages. For example, the processor circuitry 1100 of FIG. 11 and/or the FPGA circuitry 1200 of FIG. 12 may be in one or more packages. In some examples, an XPU may be implemented by the processor circuitry 1012 of FIG. 10, which may be in one or more packages. For example, the XPU may include a CPU in one package, a DSP in another package, a GPU in yet another package, and an FPGA in still yet another package.

Figure 13:
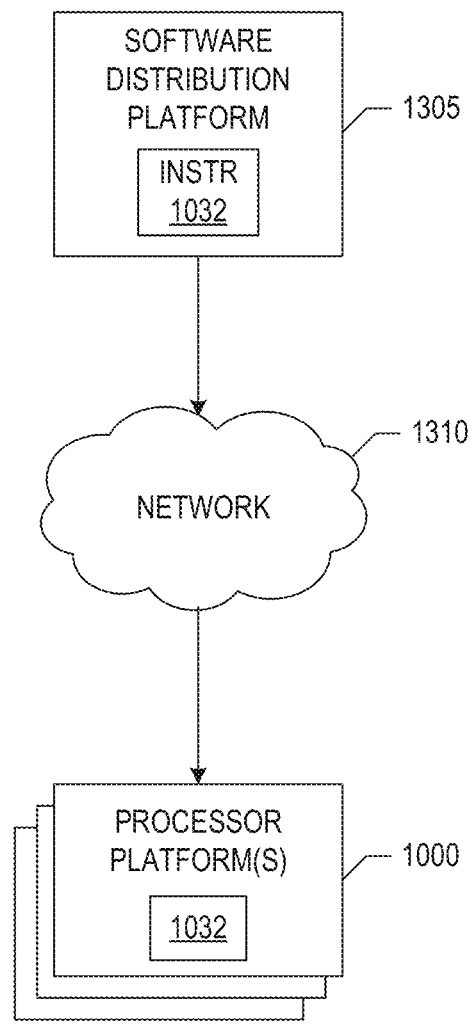
FIG. 13 is a block diagram of an example software distribution platform (e.g., one or more servers) to distribute software (e.g., software corresponding to the example machine readable instructions of FIGS. 8 and 9) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine readable instructions 1032 of FIG. 10 to hardware devices owned and/or operated by third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 1032 of FIG. 10. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine readable instructions 1032, which may correspond to the example machine readable instructions of FIGS. 8 and 9, as described above. The one or more servers of the example software distribution platform 1305 are in communication with a network 1310, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1032 from the software distribution platform 1305. For example, the software, which may correspond to the example machine readable instructions of FIGS. 8 and 9, may be downloaded to the example processor platform 1000, which is to execute the machine readable instructions 1032 to implement the text classification circuitry 114. In some example, one or more servers of the software distribution platform 1305 periodically offer, transmit, and/or force updates to the software (e.g., the example machine readable instructions 1032 of FIG. 10) to ensure improvements, patches, updates, etc., are distributed and applied to the software at the end user devices.

From the foregoing, it will be appreciated that example systems, methods, apparatus, and articles of manufacture have been disclosed that improve an efficient utilization of OCR techniques, decrease computational (e.g., processor) demand, reduce errors, and generally improve the efficiency of entities chartered with the responsibility of categorizing banners. The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to categorize image text are disclosed herein. Further examples and combinations thereof include the following:

Example 1 includes an apparatus comprising at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry including logic gate circuitry to perform one or more third operations, the processor circuitry to at least one of perform at least one of the first operations, the second operations or the third operations to identify candidate regions in an input image that includes text, generate bounding boxes around respective ones of the identified candidate regions, improve optical character recognition (OCR) by applying a mask to the input image, wherein the mask removes content of the input image except for portions of the input image within the bounding boxes, and perform OCR on the masked input image to obtain text data within the boundary boxes.

Example 2 includes the apparatus as defined in example 1, wherein the input image is a banner.

Example 3 includes the apparatus as defined in example 2, wherein the banner includes a plurality of banner images.

Example 4 includes the apparatus as defined in example 1, wherein the processor circuitry is to classify the obtained text data.

Example 5 includes the apparatus as defined in example 1, wherein the processor circuitry is to categorize the obtained text data based on coded images corresponding to respective ones of the candidate regions.

Example 6 includes the apparatus as defined in example 1, wherein the processor circuitry is to distinguish banner text from product label text.

Example 7 includes At least one non-transitory computer readable storage medium comprising instructions that, when executed, cause at least one processor to at least identify candidate regions in an input image that includes text, generate bounding boxes around respective ones of the identified candidate regions, improve optical character recognition (OCR) by applying a mask to the input image, wherein the mask removes content of the input image except for portions of the input image within the bounding boxes, and perform OCR on the masked input image to obtain text data within the boundary boxes.

Example 8 includes the at least one computer readable storage medium as defined in example 7, wherein the instructions, when executed, cause the at least one processor to identify the input image as a banner.

Example 9 includes the at least one computer readable storage medium as defined in example 8, wherein the instructions, when executed, cause the at least one processor to identify a plurality of banner images in the banner.

Example 10 includes the at least one computer readable storage medium as defined in example 7, wherein the instructions, when executed, cause the at least one processor to classify the obtained text data.

Example 11 includes the at least one computer readable storage medium as defined in example 7, wherein the instructions, when executed, cause the at least one processor to categorize the obtained text data based on coded images corresponding to respective ones of the candidate regions.

Example 12 includes the at least one computer readable storage medium as defined in example 7, wherein the instructions, when executed, cause the at least one processor to distinguish banner text from product label text.

Example 13 includes a method comprising identifying, by executing an instruction with at least one processor, candidate regions in an input image that includes text, generating, by executing an instruction with the at least one processor, bounding boxes around respective ones of the identified candidate regions, improving optical character recognition (OCR) by applying, by executing an instruction with the at least one processor, a mask to the input image, wherein the mask removes content of the input image except for portions of the input image within the bounding boxes, and performing, by executing an instruction with the at least one processor, OCR on the masked input image to obtain text data within the boundary boxes.

Example 14 includes the method as defined in example 13, wherein the input image is a banner.

Example 15 includes the method as defined in example 14, wherein the banner includes a plurality of banner images.

Example 16 includes the method as defined in example 13, further including classifying the obtained text data.

Example 17 includes an apparatus to identify text comprising region detection model training circuitry to identify candidate regions in an input image that include text, and generate bounding boxes around respective ones of the identified candidate regions, mask application circuitry to improve optical character recognition (OCR) by applying a mask to the input image, wherein the mask removes content of the input image except for portions of the input image within the bounding boxes, and OCR circuitry to perform OCR on the masked input image to obtain text data within the bounding boxes.

Example 18 includes the apparatus as defined in example 17, further including category identification circuitry to classify the obtained text data.

Example 19 includes the apparatus as defined in example 17, further including text classification circuitry to categorize the obtained text data based on coded images corresponding to respective ones of the candidate regions.

Example 20 includes the apparatus as defined in example 17, wherein the region model training circuitry is to distinguish banner text from product label text.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   interface circuitry;
   machine readable instructions; and
   at least one processor circuit to execute the machine readable instructions to:
   apply a trained object detection model to an image having product representations and descriptions associated with the product representations to detect candidate regions in the image, the image including (a) a first type of text corresponding to text in the product representations and (b) a second type of text corresponding to the descriptions associated with the product representations, the candidate regions to include the second type of text, wherein the image includes a plurality of banner images, at least two of the banner images including one or more of the product representations and corresponding ones of the descriptions;
   generate bounding boxes on the image based on the candidate regions, ones of the bounding boxes to surround respective ones of the candidate regions;
   improve performance of an optical character recognition (OCR) algorithm by generating a mask on the image based on the bounding boxes, the mask generated on the image at a first time prior to executing the OCR algorithm, the mask to conceal content of the image except for portions of the image within the bounding boxes; and
   apply, at a second time after the first time, the OCR algorithm over the masked image to obtain text data from the bounding boxes.

2. The apparatus of claim 1, wherein one or more of the at least one processor circuit is to generate the bounding boxes defining the candidate regions based on text appearance differentiation, the first type of text having an appearance that is differentiable from the second type of text.

3. The apparatus of claim 1, wherein one or more of the at least one processor circuit is to post-process an output of the OCR algorithm.

4. The apparatus of claim 1, wherein the one or more of the at least one processor circuit is to apply a trained text classification model to the text data to classify the candidate regions into categories.

5. The apparatus of claim 4, wherein one or more of the at least one processor circuit is to code the image by generating labels on the image based on the categories identified in the candidate regions.

6. The apparatus of claim 4, wherein the trained text classification model classifies first text data associated with a first one of the candidate regions into more than one category.

7. The apparatus of claim 4, wherein the trained text classification model classifies respective text data associated with corresponding ones of the candidate regions into the categories based on satisfaction of a threshold probability.

8. The apparatus of claim 1, wherein the trained object detection model includes a region proposal network.

9. At least one non-transitory computer readable storage medium comprising instructions to cause at least one processor circuit to at least:
   cause a trained object detection model to identify candidate regions in an input image having product representations and descriptions associated with the product representations, the input image including (a) a first type of text corresponding to text in the product representations and (b) a second type of text corresponding to the descriptions associated with the product representations, the candidate regions to include the second type of text, the input image having a plurality of banner images, at least two of the banner images to include one or more of the product presentations representations and corresponding ones of the descriptions;
   generate bounding boxes on the input image based on the candidate regions, respective bounding boxes to surround corresponding ones of the candidate regions;
   improve an optical character recognition (OCR) process by generating a mask for the input image based on the bounding boxes;
   apply the mask to the input image at a first time prior to performing the OCR process, wherein the mask occludes content of the input image outside the bounding boxes; and
   perform, at a second time after the first time, the OCR process on the masked input image to extract text data from within the bounding boxes.

10. The at least one non-transitory computer readable storage medium of claim 9, wherein the instructions are to cause one or more of the at least one processor circuit to generate the bounding boxes defining the candidate regions based on differentiation between the first type of text and the second type of label text.

11. The at least one non-transitory computer readable storage medium of claim 9, wherein the instructions are to cause one or more of the at least one processor circuit to post-process an output of the OCR process.

12. The at least one non-transitory computer readable storage medium of claim 9, wherein the instructions are to cause one or more of the at least one processor circuit to classify the text data into classes using a trained text classification model.

13. The at least one non-transitory computer readable storage medium of claim 12, wherein the instructions are to cause one or more of the at least one processor circuit to generate indications of the classes on the input image.

14. The at least one non-transitory computer readable storage medium of claim 9, wherein the trained object detection model includes a region proposal network.

15. The at least one non-transitory computer readable storage medium of claim 9, wherein the instructions are to cause one or more of the at least one processor circuit to classify the text data into classes based on satisfaction of a threshold probability.

16. A method comprising:
    identifying, by executing an instruction with at least one processor, candidate regions in an image using a trained object detection model, the image including a plurality of banner images having product representations and descriptions associated with the product representations, the image including (a) a first type of text corresponding to text in the product representations and (b) a second type of text corresponding to the descriptions associated with the product representations, the candidate regions corresponding to the second type of text in the image, and defined by bounding boxes surrounding instances of the second type of text in the image, wherein at least two of the banner images include one or more of the product representations and corresponding ones of the descriptions;

improving an optical character recognition (OCR) algorithm by generating, by executing an instruction with the at least one processor, a mask on the image at a first time prior to executing the OCR algorithm, the generating of the mask to be based on the candidate regions and the bounding boxes, wherein the mask obscures content of the image except for portion of the image within the bounding boxes; and applying, by executing an instruction with the at least one processor, the OCR algorithm to the masked image to extract text data from the image, the text data corresponding to the first type of text positioned in the bounding boxes, wherein the OCR algorithm is applied to the masked image at a second time that is after the first time.

17. The method of claim 16, further including generating the bounding boxes defining the candidate regions based on text appearance differentiation.

18. The method of claim 16, further including classifying instances of the text data into corresponding classes by applying a trained text classification model to the text data.

19. The method of claim 18, further including generating identifiers corresponding to the classes on the image, ones of the classes generated proximate to corresponding ones of the instances of the text data.

20. The method of claim 16, wherein the trained object detection model includes a region proposal network.

* * * * *

UNITED STATES PATENT AND TRADEMARK OFFICE
CERTIFICATE OF CORRECTION

PATENT NO. : 12,277,786 B2
APPLICATION NO. : 18/476978
DATED : April 15, 2025
INVENTOR(S) : Arroyo et al.

Page 1 of 1

It is certified that error appears in the above-identified patent and that said Letters Patent is hereby corrected as shown below:

In the Claims

In Column 22, Claim 9, Line 9, delete "presentations".

Signed and Sealed this
Second Day of September, 2025

Coke Morgan Stewart
*Acting Director of the United States Patent and Trademark Office*